United States Patent
Ganong, III

(10) Patent No.: US 9,576,580 B2
(45) Date of Patent: Feb. 21, 2017

(54) IDENTIFYING CORRESPONDING POSITIONS IN DIFFERENT REPRESENTATIONS OF A TEXTUAL WORK

(71) Applicant: Nuance Communications, Inc., Burlington, MA (US)

(72) Inventor: William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/144,449

(22) Filed: May 2, 2016

(65) Prior Publication Data

US 2016/0247504 A1     Aug. 25, 2016

Related U.S. Application Data

(63) Continuation of application No. 13/799,674, filed on Mar. 13, 2013, now Pat. No. 9,378,739.

(51) Int. Cl.
*G10L 15/26* (2006.01)
*G06F 17/30* (2006.01)
(Continued)

(52) U.S. Cl.
CPC ......... *G10L 15/26* (2013.01); *G06F 17/30675* (2013.01); *G06F 17/30746* (2013.01);
(Continued)

(58) Field of Classification Search
CPC ........ G10L 15/26; G10L 15/02; G10L 15/063; G10L 2015/0635; G06F 17/30675; G06F 17/30746
See application file for complete search history.

(56) References Cited

U.S. PATENT DOCUMENTS 8,918,388 B1    12/2014   Chen
9,368,115 B2     6/2016   Ganong, III
(Continued)

OTHER PUBLICATIONS

[No Author Listed] Readme for Penn Phonetics Lab Forced Aligner. Text and Version 1.003 of software available online at http://www.ling.upenn.edu/phonetics/p2fa/readme.txt. Jul. 2009.
(Continued)

*Primary Examiner* — Qian Yang
(74) *Attorney, Agent, or Firm* — Wolf, Greenfield & Sacks, P.C.

(57) ABSTRACT

Described herein are techniques for determining corresponding positions between different representations of a textual work. In some of the techniques, portions of one or more representations may be processed. A determination of a corresponding position may be made in response to a request received from a user, such as a reader that desires to switch between representations. The request may indicate a position in one representation and the representation to which the user would like to switch. In response to receiving the request, one or more portions of one or more representations of a textual work may be processed. In some techniques, a corresponding position between different representations may be determined without processing the entirety of one or more representations of the textual work. For example, a corresponding position may be determined without processing an entire audio representation.

20 Claims, 14 Drawing Sheets

(51) Int. Cl.
*G10L 15/02* (2006.01)
*G10L 15/06* (2013.01)
(52) U.S. Cl.
CPC ............ *G10L 15/02* (2013.01); *G10L 15/063* (2013.01); *G10L 2015/0635* (2013.01)

(56) References Cited

U.S. PATENT DOCUMENTS

| | | |
|---|---|---|
| 2009/0144295 A1 | 6/2009 | Mion et al. |
| 2011/0047169 A1 | 2/2011 | Leighton et al. |
| 2011/0153330 A1 | 6/2011 | Yazdani et al. |
| 2011/0288862 A1* | 11/2011 | Todic .................... G10L 15/05 704/235 |
| 2012/0245721 A1 | 9/2012 | Story, Jr. et al. |
| 2012/0245936 A1* | 9/2012 | Treglia .............. G06F 17/30746 704/235 |
| 2012/0246343 A1 | 9/2012 | Story, Jr. et al. |
| 2013/0021346 A1 | 1/2013 | Terman |
| 2013/0030804 A1 | 1/2013 | Zavaliagkos et al. |
| 2013/0074133 A1 | 3/2013 | Hwang et al. |
| 2013/0124212 A1* | 5/2013 | Scoggins, II .......... H04N 9/475 704/276 |
| 2013/0173269 A1* | 7/2013 | Adler .................. G06F 17/2775 704/251 |
| 2014/0039887 A1 | 2/2014 | Dzik et al. |
| 2014/0278354 A1 | 9/2014 | Ganong, III |
| 2014/0278401 A1 | 9/2014 | Ganong, III |
| 2014/0278429 A1 | 9/2014 | Ganong, III |

OTHER PUBLICATIONS

[No Author Listed] The Penn Phonetics Lab Forced Aligner. Available online at http://www.ling.upenn.edu/phonectics/p2fa/. Last modified Mar. 21, 2012.

[No Author Listed] Whispersync for voice. Available online at http://www.audible.com/mt/wfs. Retrieved Apr. 15, 2013.

Yuan et al., Speaker Identification on the SCOTUS corpus. Proceedings of Acoustics 2008.

\* cited by examiner $a_2 = a_1 * (t_1/t_2)$

IDENTIFYING CORRESPONDING POSITIONS IN DIFFERENT REPRESENTATIONS OF A TEXTUAL WORK

CROSS-REFERENCE TO RELATED APPLICATIONS

The present application is a continuation of and claims the benefit under 35 U.S.C §120 of U.S. patent application Ser. No. 13/799,674, entitled "IDENTIFYING CORRESPONDING POSITIONS IN DIFFERENT REPRESENTATIONS OF A TEXTUAL WORK," filed Mar. 13, 2013, which is incorporated herein by reference in its entirety.

BACKGROUND

Textual works (e.g., novels) may be available in multiple different representations, including hardcopy representations (e.g., books), electronic representations (e.g., electronic books or "eBooks"), and audio representations (e.g., audiobooks). Each of the representations may include the words of the textual work in a different form. A hardcopy book, for example, may include the words of a novel printed in ink on a paper page, an audiobook may include recorded audio of a person speaking the words of the novel or synthesized audio produced by a text-to-speech engine based on the words of the novel, and an electronic book may include the words of the novel encoded in one or more computer data structures that may be stored on one or more storage media such as computer memory or a hard disk drive.

SUMMARY

In one embodiment, there is provided a method for use in identifying corresponding positions in an audio representation of a textual work and an electronic representation of the textual work. The method comprises performing automatic speech recognition (ASR) on a first audio segment appearing in the audio representation at a first audio position to generate a first textual representation of the first audio segment, and identifying a first text position corresponding to the first audio position by searching the electronic representation of the textual work for text matching the first textual representation.

In another embodiment, there is provided at least one computer-readable storage medium having encoded thereon computer-executable instructions that, when executed by a computer, cause the computer to carry out a method for use in identifying corresponding positions in an audio representation of a textual work and an electronic representation of the textual work. The method comprises performing automatic speech recognition (ASR) on a first audio segment appearing in the audio representation at a first audio position to generate a first textual representation of the first audio segment, and identifying a first text position corresponding to the first audio position by searching the electronic representation of the textual work for text matching the first textual representation.

In a further embodiment, there is provided an apparatus comprising at least one processor and at least one computer-readable storage medium. The at least one computer-readable storage medium has encoded thereon computer-executable instructions that, when executed by a computer, cause the computer to carry out a method for use in identifying corresponding positions in an audio representation of a textual work and an electronic representation of the textual work. The method comprises performing automatic speech recognition (ASR) on a first audio segment appearing in the audio representation at a first audio position to generate a first textual representation of the first audio segment, and identifying a first text position corresponding to the first audio position by searching the electronic representation of the textual work for text matching the first textual representation.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
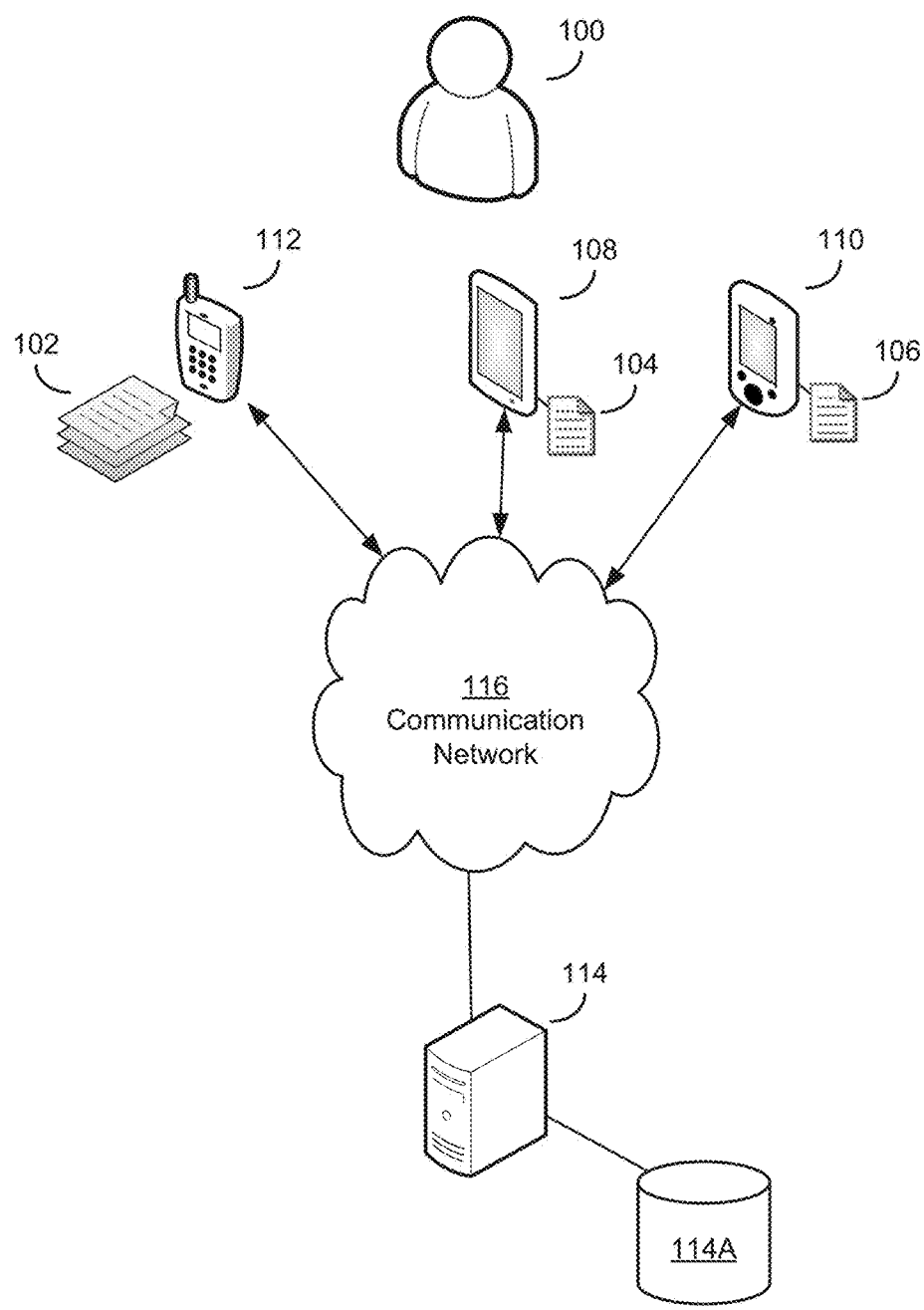
FIG. 1 illustrates an example environment in which some embodiments may operate.

When a textual work (e.g., a novel) is available in multiple different representations, some readers may switch between representations when reading the textual work. Such readers may, for example, read a textual work in a hardcopy representation at home, listen to the textual work in an audio representation while commuting or exercising, and/or read the textual work in an electronic representation when travelling.

The inventor has recognized and appreciated that switching between representations is currently inconvenient for these readers. To switch representations, the reader must recall a position he/she most recently read (or listened to) in one representation and find that position in the other representation. This may include flipping through pages of a hardcopy book, scrolling through an electronic book, or fast forwarding and rewinding an audiobook to find the right position. The reader may need to scan back and forth through the desired representation multiple times to find the portion of the textual work (e.g., particular words or sentences) for which the reader is searching, which may frustrate the reader. The inventor has recognized and appreciated that this challenge in finding corresponding positions between representations may discourage readers from switching representations when reading a textual work, despite that one representation may not be convenient for all times at which the reader wants to read (or listen to) the work.

One technique that has been proposed for assisting readers with switching between an audiobook and an eBook uses a map that identifies a correspondence between all positions in the audiobook and all positions in the eBook. In this conventional technique, the map is created in advance, before a reader requests that a corresponding position be identified, by performing an alignment process on the audiobook and eBook. An alignment process includes examining words that are included in the eBook and finding the most likely position of those words in the audiobook. Once the most likely position of a word is identified, the position of that word in the eBook is identified as corresponding to the position in the audiobook and stored in the map. That process is repeated for all words in the eBook such that the map includes entries for all words in the eBook. Subsequently, when a reader desires to switch between an audiobook and an eBook, the map is queried based on the reader's current position in one representation and a corresponding position in the other representation is retrieved from the map.

The inventor has recognized and appreciated that this conventional alignment and map creation technique may use a relatively large amount of resources, and requires that a map be pre-generated. The alignment process may be processor-intensive and the maps may use a relatively large amount of storage, particularly for lengthy books. The inventor has also recognized and appreciated that, as a result of the resources used, this conventional technique may be disadvantageous for wide use in identifying corresponding positions between audio representations of textual works and electronic representations of those textual works. The alignment and map creation technique was proposed for creating maps for new books as the new books are released in eBook and audiobook formats, and may be useful for popular new books that are released each year in these representations, where the expenditure of resources may be justified by the volume of books. However, the inventor has recognized and appreciated that there is a large number of textual works that are available or that may be made available in both audio and electronic representations and for which no mapping exists. For readers to switch between representations of textual works by taking advantage of this conventional technique, the alignment and map creation would need to be carried out in advance for all such textual works, such that maps for the textual works are available for querying by readers. Performing the alignment and map creation in advance for these textual works would require a great deal of resources, and may not be practical in all cases, including for textual works that are produced in relatively small volumes.

The inventor has recognized and appreciated that readers could be assisted in switching from one representation of a textual work to another via techniques that may not require creating a mapping between the representations for the entirety of the textual work in advance. The inventor has further recognized and appreciated that automatic speech recognition (ASR) techniques and/or optical character recognition (OCR) techniques can be used to process portions of different representations of a textual work to identify corresponding positions in the different representations.

For example, if a reader desires to switch between an audio representation of a textual work and an electronic representation of the textual work, ASR could be performed on a segment of audio appearing in the audio representation to identify one or more words and/or phrases that appear in the audio segment. Once the words and/or phrases are identified, the electronic representation can be searched to identify a position at which text matching the words/phrases appears in the electronic representation.

In this example, if the reader is switching from the audio representation to the electronic representation, the audio segment that is processed using ASR may be an audio segment appearing at a current position of playback of the audio representation, and a position in the electronic representation at which text matching the words generated through the ASR appears may be the position that corresponds to the current playback position in the audiobook. If the reader is switching from the electronic representation to the audio representation, the audio segment that is processed using ASR may be an audio segment appearing at a position that is estimated to correspond to a position of a cursor in the electronic representation. Once words appearing in the audio segment are converted to text using ASR, the electronic representation may be searched to identify positions of text in the electronic representation that matches the words. If the position at which the words appear does not match the cursor position then, based on a difference between the position at which the words appear in the electronic representation and the position of the cursor in the electronic representation, the estimate of the corresponding position may be refined and another segment of the audio processed using ASR.

Using these processes, portions of an audio representation of a textual work and/or an electronic representation of the textual work may be analyzed to identify corresponding positions in the representations. Using these techniques, it is not necessary to process an entirety of an audio representation to determine a corresponding position between the audio representation and the electronic representation.

Similarly, if a reader desires to switch between a hardcopy representation of a textual work and a digital representation of the textual work, which may be an electronic representation or an audio representation, OCR and/or ASR may be used such that one or more portions of representations of the textual work are processed. For example, the reader may obtain an image (e.g., by taking a photo with a mobile phone) of a portion of the hardcopy representation that includes the reader's current position in the hardcopy representation, and this image may be processed using OCR techniques to identify textual content (e.g., one or more characters, words, or phrases) appearing in the image. Once the textual content is identified, a position at which that textual content appears in a digital representation of the textual work can be determined. To determine the position in the digital representation, an electronic representation of the textual work could be searched based on the textual content to identify a position at which the text matching the textual content appears. If the reader desires to switch to the electronic representation, then the position at which the text matching the textual content determined using OCR may be the position in the electronic representation corresponding to the reader's position in the hardcopy book. If the reader desires to switch to an audio representation, then a process such as the one discussed above may be used. For example, the corresponding position in the audio representation may be estimated and ASR may be performed on a segment that appears at the estimated position. If an electronic representation of the textual work is available, it may be searched for words matching the words generated using the ASR, an estimate of the corresponding position may be refined, such as through refining the estimate based on differences in position, as discussed above.

Accordingly, some embodiments below relate to described techniques for determining corresponding positions between different representations of a textual work. In some of the techniques described herein, portions of one or more representations may be processed, such as using ASR and/or OCR processes, as part of determining the corresponding positions. A determination of a corresponding position may be made in response to a request received from a user, who may be a reader that desires to switch between representations. The request may indicate a position in one representation and the representation to which the user would like to switch. In response to receiving the request, one or more portions of one or more representations of a textual work may be processed, such as using ASR, OCR, or other processes. In some of the techniques described herein, a corresponding position between different representations may be determined without processing the entirety of one or more representations of the textual work. For example, a corresponding position may be determined without processing the entire audio representation to identify the words appearing throughout the audio representation and without generating, in advance, a mapping identifying corresponding positions between an entirety of the audio representation and another representation of the textual work.

Various examples of techniques for determining corresponding positions between representations of a textual work are described below. It should be appreciated, however, the techniques described herein are not limited to the specific examples below or to determining corresponding positions in any particular manner.

Embodiments may be used to determine corresponding positions between any suitable representations of any textual work. Embodiments are not limited to operating with any particular type(s) of textual works. A textual work may be any content unit that includes text, including a novel, short story, essay (e.g., from a newspaper, magazine, etc.), article, magazine, journal, script, poem, blog entry, podcast, transcription, textbook or other instructional materials, a collection of one or more of the preceding examples, or any other suitable collection of text. Different representations of the textual work may include textual representations in which the text is formatted in different ways.

A textual work may be available in an audio representation. An audio representation may include the text of the textual work in an audio format. The audio format may be a recording of one or more humans speaking the text of the textual work, synthesized speech corresponding to the text, or any other suitable audio representation of text. The audio of an audio representation may be encoded using any suitable encoding scheme, as techniques described herein are not limited in this respect. An audio representation may be stored on one or more storage media for playback by an audio reproduction device, such as a device capable of playing audio. The storage media may be a memory, optical disk, memory card, or other storage medium. Embodiments are not limited to operating with any particular type or types of storage media. To access a textual work in an audio representation, a reader may listen as the audio corresponding to the text of the textual work is played back by a device via an audio output device, such as a speaker or headphones. In some cases, an audio representation of a textual work may be associated with visual content, such as an image or a video. In such cases, the audio of the audio representation may be stored together with or separately from data of the visual content, as techniques described herein are not limited to use within any particular type of audio representation.

A textual work also may be available in an electronic representation. In some embodiments, an electronic representation of a textual work may include the text of the textual work encoded in a text- or character-encoding scheme, such as a binary data encoding scheme. Any suitable encoding scheme may be used, as techniques described herein are not limited in this respect. The encoded text may be stored on one or more storage media, which may be any suitable storage media as techniques described herein are not limited in this respect. In some cases, a storage medium on which an electronic representation of a textual work is stored may be a storage (e.g., memory or disk storage) of a computing device. Such a computing device may be a device that is configured to perform functions other than presenting text of an electronic representation to a reader (e.g., laptop or desktop personal computer, a tablet computer, or a smart phone) or a device that is dedicated to presenting text of an electronic representation to a reader (e.g., electronic book reader). When stored on a storage medium, the text of an electronic representation may be arranged in one or more computer data structures (e.g., one or more files), which may be formatted in any suitable manner and may additionally include any suitable data or metadata, as techniques described herein are not limited in this respect. To read a textual work in an electronic representation, a reader may view portions of text of the textual work on a display screen of a computing device, and may provide input to the computing device to display different portions of the text by scrolling the text or replacing displayed text with other text.

A textual work may be available in a hardcopy representation reproduced in a visually-perceptible manner fixed on one or more media. For example, the text may be printed, engraved, patterned, embossed, or otherwise produced on one or more media. The medium/media on which the text is reproduced may be any suitable media, as techniques described herein are not limited in this respect. In some embodiments, a medium on which the text is reproduced may include wood or plastic. In some embodiments, a hardcopy representation of a textual work may include the text printed using ink, toner, or another substance on paper, and the hardcopy representation of the textual work may be or be included in, for example, a paperback or hardcover book, a newspaper, or a magazine.

In some embodiments, a textual work may be available in two or three representations, including an audio representation, an electronic representation, and/or a hardcopy representation. Techniques described below may be used to assist a reader with switching between two representations of a textual work. It should be appreciated from the foregoing that embodiments are not limited to any particular type of textual work or any particular representations. For ease of description, in some of the examples below the textual work may be referred to as a novel, a hardcopy representation may be referred to as a book, an electronic representation may be referred to as an eBook, and an audio representation may be referred to as an audiobook, but it should be appreciated that these are merely examples.

FIG. 1 illustrates an example of an environment in which techniques described herein may be implemented. In the example of FIG. 1, a reader 100, who may be a human reader, is reading a novel that is available in multiple representations: book 102, eBook 104, and audiobook 106. The eBook 104 is stored in memory of an eBook reader 108 which includes a display on which the text of the eBook 104 is displayed. The audiobook 106 is stored in memory of an audio player 110, which may be a smart phone, portable media player, or other device that may reproduce music, audiobooks, and/or other audio.

In the example of FIG. 1, the reader 100 is reading the novel in one representation (referred to below as the "source representation") and wants to switch to reading the novel in another representation (referred to below as the "target representation"), such as by switching from eBook 104 to audiobook 106. The reader 100 may desire to find a position in the audiobook 106 that corresponds to a position in the source representation (referred to as a "source position"), may be a position at which reader 100 is reading the source representation or another point in the audiobook 106. When the source representation is eBook 104, the source position may be the position of the eBook104 cursor. The cursor may be associated with a word position or any other suitable indication of position. When the target representation is audiobook 106, the corresponding position in the target representation may be a time (e.g., minute and second) in the audiobook 106 at which audio appears that corresponds to the words that appear in the eBook 104 at the cursor position.

The environment of FIG. 1 includes one or more servers 114 that may assist the reader 100 with switching between representations by identifying a position in the target representation of the textual work that corresponds to an identified position in the source representation. The server(s) 114 may execute a position determination engine (hereafter, PDE) that, upon receiving a request from the reader 100 for a corresponding position, determines the corresponding position. The server(s) 114 may be able to communicate with one or more data stores 114A that may include any suitable data that may be used by the PDE. The data store 114A may include, for example, a copy of the eBook 104, a copy of the audiobook 106, and, in some embodiments, a mapping indicating corresponding positions that were previously determined by the PDE. The PDE may be configured to process one or more portions of one or more representations of the novel as part of determining corresponding positions, such as by performing ASR on an audio segment of the audio representation and/or performing OCR on an image of a page of a hardcopy representation. The PDE of the server(s) 114 may perform using ASR and/or OCR processing capabilities of the position determining engine, the ASR or OCR in any suitable manner, including by performing the processing itself or by requesting that a separate ASR engine and/or an OCR engine perform the processing and return results of the processing to the PDE.

To determine a corresponding position using the PDE, reader 100 may transmit a request to the server(s) 114. The request may include a source position in the source representation (e.g., a current position at which the reader 100 is reading the novel) and may additionally identify the target representation.

The reader 100 may transmit the request to the PDE and the server(s) 114 in any suitable manner, as the techniques described herein are not limited in this respect. In the example of FIG. 1, the reader 100 may operate one or more of devices 108, 110, 112 to generate and transmit the request via computer communication network 116. Network 116 may be any suitable network or combination of networks, including one or more wired and/or wireless communication networks. Network 116 may include a local area network (LAN), a wide-area network (WAN) such as a cellular network, and/or the Internet, as the techniques described herein are not limited in this respect.

The device that transmits the request to the PDE and the server(s) 114 may be a device that corresponds to the source representation or the target representation. For example, in some embodiments the device that transmits the request may be a device that the reader 100 is using to read the novel in the source representation. For example, the reader 100 may operate the eBook reader 108 or may operate the audio player 110 to generate and transmit the request. The devices 108, 110, 112 may therefore each be configured with a position requesting engine that the devices 108, 110, 112 may execute to generate and transmit the request, and may include one or more network adapters to enable the devices 108, 110, 112 to communicate via network 116 to transmit the request. As part of generating the request, the position requesting engine may identify a source position, such as by reviewing information regarding the source representation that may include information indicating a furthest position in the source representation to which the reader 100 has read, asking the reader 100 to input the source position via a user interface, or in any suitable manner. The position requesting engine may also identify a target representation, such as by requesting that the reader 100 input the target representation via a user interface, or in any suitable manner. Once the position requesting engine generates the request, the engine transmits the request to the server(s) 114.

When the source representation is book 102, the device 112 may execute the position requesting engine to generate and transmit the request. In this case, as part of generating the request, the PDE may obtain an image of the book 102 to identify the source position in the book 102. The device 112 may be a device that includes a camera (e.g., a smart phone or tablet computer), in which case the position requesting engine may use the camera to obtain an image of at least a portion of the page that includes the position in the novel at which the reader 100 would like to begin reading the novel in the target representation. The image may be included in the request that is transmitted to the PDE and the server(s) 114.

Upon receipt of a request from one of the devices 108, 110, 112, the PDE may determine a target position in the target representation that corresponds to the source position that is identified in the request. The PDE may determine the corresponding position in any suitable manner, examples of which are described below. Upon determining the corresponding position, the PDE may identify the corresponding position for the user in any suitable manner. For example, the PDE may transmit information identifying the target position to the device that transmitted the report, and that device (e.g., device 108, 110, 112) may output the corresponding position to the reader 110 via a user interface. It should be appreciated, however, that embodiments are not limited to identifying the corresponding position to a user in any particular way. In other embodiments, the PDE may identify the corresponding position to a device (e.g., device 108, 110, 112) and the device may present the textual work to a user starting from the corresponding position. Additionally or alternatively, in some embodiments the PDE may store the corresponding position in some manner. The PDE may, in some embodiments, additionally or alternatively notify a user of the corresponding position through transmitting a message to the user via e-mail, Short Message Service (SMS) message, or other message.

It should be appreciated that the environment of FIG. 1 is merely an example of environments in which some embodiments may be implemented, and that techniques described herein are not limited to operating in the environment of FIG. 1.

Some embodiments may include a PDE that is implemented in whole or in part on a device that the reader 100 may use to read the novel in one or more representations. Further, in some environments the reader 100 may access the novel in two different representations using the same device, such that functionality of two or more of the devices 108, 110, 112, and device 114 may be implemented on the same physical device. In some such embodiments, the combined device may be a tablet computer or other computing device that the reader 100 may use to read eBook 104, listen to audiobook 106, take pictures of book 102, and determine corresponding positions between representations 102, 104, 106.

In environments in which the PDE is on a same device the reader 100 may use to read the novel, the PDE may communicate with one or more other devices as part of determining a corresponding position. For example, the PDE may communicate with another device, via a network, to determine whether a mapping already includes a corresponding position for a source position, to add an entry indicating corresponding positions between two representations to a mapping, and/or to process a portion of a representation. In these embodiments, to process a portion of a representation, the PDE may send the portion to a device to perform the process, such as by sending an audio segment to be processed using an ASR engine executing on another device, or sending an image to be processed using an OCR engine executing on another device, and may receive the results of the processing from the other device.

In some other embodiments, both the PDE and the position requesting engine may be implemented apart from a device that the reader 100 may use to read the novel in one or more representations. In these embodiments, a device may implement the position requesting engine and a user or one or more of the devices 108, 110, 112 may communicate with the device to request that the position requesting engine generate a request for a corresponding position in a target representation. In these embodiments, the user or the device(s) 108, 110, 112 may provide to the device that implements the position requesting engine information regarding a source position and a target representation. In some embodiments, the position requesting engine (and, in some cases, the PDE) may be implemented on one or more of the devices 108, 110, 112 and others of the devices 108, 110, 112 may communicate with the device to request a corresponding position.

Figure 2:
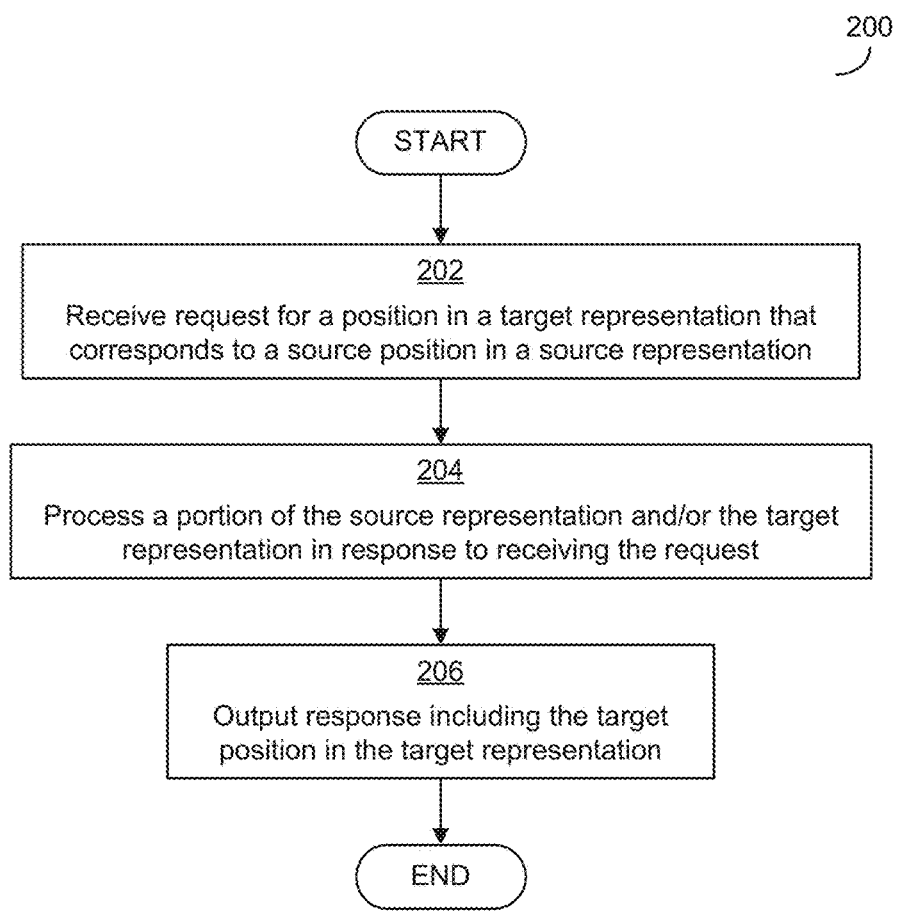
FIG. 2 is a flowchart of a process that may be implemented in some embodiments to determine a target position in a target representation of a textual work that corresponds to a source position in a source representation of the textual work.

FIG. 2 illustrates a process 200 that may be used by a PDE to determine a target position, in a target representation of the textual work, that corresponds to a source position in a source representation of a textual work. The process 200 begins in block 202, in which the PDE receives a request to determine a position in a target representation that corresponds to a source position in a source representation. The source position and the target representation may be identified in the request. The request may be received in any suitable manner, including by being received from a user via a user interface or being received via a computer communication network. In block 204, in response to receiving the request, the PDE determines the corresponding position, at least in part by processing a portion of the source representation and/or a portion of the target representation. After determining the corresponding position, in block 206 the PDE responds to the request by outputting a response that includes the target position in the target representation that corresponds to the source position. The PDE may output the response in block 206 in any suitable manner, such as by outputting the response via a user interface or via a network adapter to a computer communication network or by triggering the presentation of the textual work from the corresponding position in the target representation. After the PDE outputs the response in block 206, the process 200 ends.

FIGS. 3-10 illustrate examples of techniques that may be used by the PDE (e.g., to implement the process 200) to identify corresponding positions between particular representations.

Figure 3:
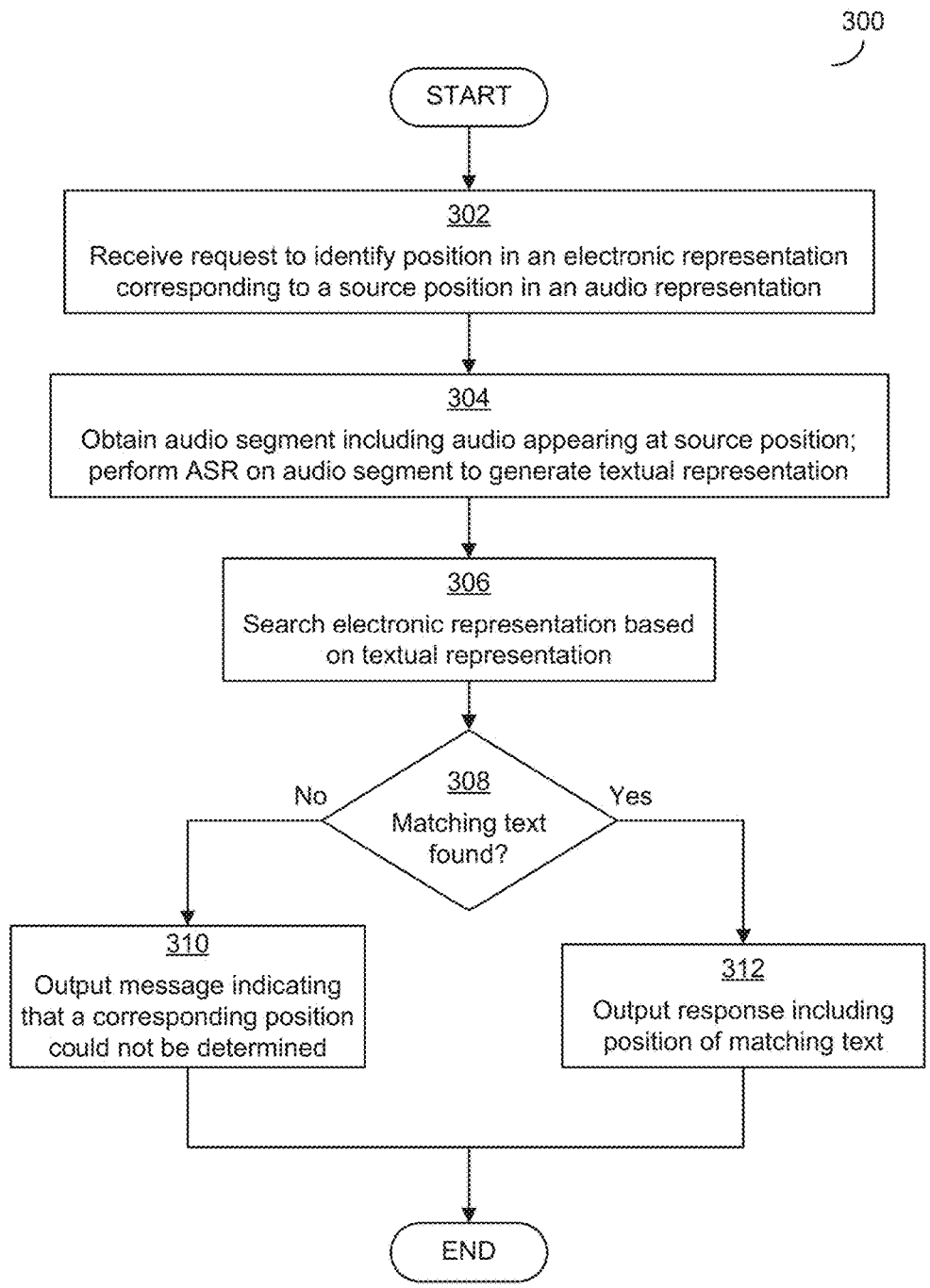
FIG. 3 is a flowchart of a process that may be implemented in some embodiments for determining a position in an electronic representation of a textual work that corresponds to a position in an audio representation of the textual work.

FIG. 3 illustrates a process 300 that may be used in some embodiments to determine a position in an electronic representation of a textual work that corresponds to a position in an audio representation of the textual work. It should be appreciated that techniques described herein are not limited to carrying out the process 300 of FIG. 3 to determine corresponding positions between audio representations and electronic representations and that other processes may be used.

The process 300 begins in block 302, in which the PDE receives a request that identifies a source position in an audio representation and identifies the target representation as an electronic representation. The source position in the audio representation may be represented in any suitable manner. For example, the source position may be represented as a time into the audio representation where the same position is found (e.g., a number of minutes and/or seconds) (e.g., an amount of time that would elapse if audio of the audio representation was played continuously until the source position was reached).

In block 304, the PDE obtains an audio segment of the audio representation and performs automatic speech recognition (ASR) on the audio segment.

The audio segment that is obtained in block 304 may be of any suitable length (e.g., five or ten seconds), as techniques described herein are not limited in this respect. In some embodiments, the audio segment may be determined based on to the source position identified in the request received in block 302. For example, the audio segment may be a segment that includes audio at the source position. The audio segment may be a segment that begins at the source position, an audio segment that is centered at the source position, a segment that ends at the source position, or any other suitable segment that includes audio that relates to the source position.

The obtained portion of the audio representation is indicative of a position in a textual work at which the reader wants to begin reading the electronic representation. The audio can be used to determine the corresponding position in the electronic representation of the textual work.

In block 304, the PDE performs ASR (in any suitable manner) on the audio segment to generate a textual representation of the audio segment. In some embodiments, the PDE may include an ASR engine and may perform the ASR itself. In other embodiments, the PDE may provide the audio segment to an ASR engine and request that the ASR engine perform ASR on it. Performing ASR includes analyzing audio of an audio segment to identify whether the audio corresponds to one or more words and/or phrases and, if so, what words/phrases correspond to the audio. As part of performing ASR, an ASR engine may identify and output one or more words/phrases and a confidence value that indicates a confidence of the ASR engine that the output words/phrases are an accurate representation of an audio segment. Therefore, in block 304, by performing ASR on the audio segment, the PDE may obtain a textual representation of the audio segment that includes one or more words/ phrases and may obtain a confidence value indicating a confidence of an ASR engine that the textual representation is an accurate representation of the audio.

In block 306, the PDE searches the electronic representation for text that matches the textual representation of the audio segment. The PDE may search the electronic representation in any suitable manner, including by obtaining a copy of the electronic representation and searching the electronic representation itself, or by providing the textual representation to a search engine and requesting that the search engine search the electronic representation based on the textual representation of the audio segment. To search the electronic representation, encoded text of the electronic representation, which may be stored in one or more data structures, may be reviewed to determine whether any of the encoded text matches the textual representation of the audio segment.

Any suitable search technique may be used. In some embodiments, the search may review the electronic representation to determine whether any text included in the electronic representation exactly matches the textual representation of the audio segment. Like, when a sequence of words included in the text is identical to a sequence of words included in the textual representation of the audio segment. In some other embodiments, in addition to or as an alternative to determining whether any text included in the electronic representation is an exact match, the search may review the electronic representation to determine whether any text is similar to the textual representation, e.g., by performing a fuzzy search of the electronic representation based on the textual representation of the audio segment.

Embodiments may use a fuzzy search or other search to review the electronic representation for text that is similar rather than an exact match to compensate for errors that may in the textual representation of the audio segment due to misrecognition by the ASR engine in block 304. In cases in which the textual representation is incorrect, if the electronic representation were only searched for text exactly matching the textual representation, it is possible that no matching text would be found, or that an incorrect match would be detected.

In block 306, the PDE may search the electronic representation for matching text, which may include searching the electronic representation for text that is similar but not an exact match for the textual representation of the audio segment. As mentioned above, in some embodiments, a fuzzy search may be carried out. In some embodiments, the search may review the electronic representation for text that has a low edit distance to the textual representation of the audio segment. The edit distance for text in the electronic representation relative to the textual representation of the audio segment indicates a number of changes that would need to be made to the text in the electronic representation to produce the textual representation of the audio segment. The changes may include changes to characters included in the text, changes to words included in the text, and/or any other changes that may be made to text. A search may be performed for text having a low edit distance to the textual representation because text that has a low edit distance may be more similar to the textual representation than text having a higher edit distance. In some embodiments, text having a low edit distance may be identified as text having an edit distance below a threshold. In some embodiments, in addition to or as an alternative to searching the electronic representation for text having a low edit distance to the textual representation, the electronic representation may be searched for text that is acoustically-similar to the textual representation. Text that is acoustically-similar to the textual representation may include text that has phones or phonemes in common with the textual representation. For example, acoustically-similar text may have a majority of, or more than a threshold percentage of, phones/phonemes in common with the textual representation. In some embodiments, search techniques that use finite state machines (FSMs) may be used to perform the search of block 304. However, any suitable search techniques may be used as techniques described herein are not limited in this respect.

In block 308, the PDE determines whether matching text was identified through the searching of block 306. If it is determined in block 308 that no matching text was identified, then in block 310 the PDE may output, as a response to the request of block 302, a message indicating that no corresponding position was identified. If, however, in block 308 the PDE determines that matching text was identified, then in block 312 the engine outputs, as a response to the request, a message indicating that a corresponding position was identified. The message indicating that a corresponding position was identified may include the corresponding position and may identify, as the corresponding position, a position at which the matching text appears in the electronic representation. The corresponding position may be identified in any suitable manner. Non-limiting examples of ways to identify the corresponding position in the textual work include a word location or a relative position. The word location may indicate, for the electronic representation, a location of a word that corresponds to the source position of the audio representation, where the location of the word may be expressed as, for example, a count of words that precede the word. A relative position may be a fractional or percentage position that indicates an amount of content that precedes the source position in the audio representation, such as whether the source position is at approximately halfway through the audio representation, three-quarters of the way through the audio representation, twenty percent of the way through, etc. Messages may be output in block 310, 312 in any suitable manner, as discussed above. In some cases, the message may be output via a user interface or via a network adapter. In some embodiments (e.g., where source and target representation are stored on or accessible to the same device and may be presented to a user on the same device), the PDE may output the message in block 312 by triggering presentation of the textual work, in the target representation, from the corresponding position.

Once a response message is output in block 310 or in block 312, the process 300 ends.

In the example of FIG. 3, if matching text is not found as a result of the search of block 306, a failure message is output in block 310. All embodiments are not limited to outputting a failure message in response to not finding matching text after only one search of text of the electronic representation. In some embodiments, if matching text is not identified through the searching of block 306, the PDE may instead obtain a new audio segment from the audio representation, perform ASR on the new audio segment, and search based on a textual representation of the new audio segment. The engine may continue obtaining new audio segments and searching based on new textual representations until matching text is found or until a threshold number of retries is made. In embodiments in which a new audio segment is obtained, any suitable audio segment can be obtained. In some such embodiments, the new audio segment may be within a threshold distance of the source position identified in the request received in block 302. For example, the new audio segment may be a segment that appears a number of seconds before or after the source position. In other embodiments, the new audio segment may also include the source position (which was included in the audio segment obtained in block 304. The new audio segment may be an audio segment that includes the source position at a different position in the audio segment than a previous audio segment. For example, if an audio segment that starts at the source position was previously obtained, then the new audio segment may be an audio segment that ends at the source position. As another example, an audio segment of a different length may be obtained. If a previously-obtained audio segment was three seconds long, a new audio segment may be five seconds long. A longer audio segment may include more words and/or phrases than a shorter audio segment, and the ASR engine may, in some cases, be able to recognize better an audio segment with more words/phrases. The examples described above for obtaining alternative audio samples are merely illustrative as the techniques described herein are not limited to obtaining a new audio segment in any particular manner.

In some cases, the textual representation generated by an ASR engine from the audio segment may include a sequence of words that appears multiple times in the electronic representation. In some embodiments, the search of block 306 may return the first instance of matching text and not return other instances. In other embodiments, the search may return multiple instances of matching text. When that multiple instances of matching text are returned, embodiments may evaluate the instances in any suitable manner to select one of the instances to identify as corresponding to the audio segment. In some embodiments, the engine may evaluate relative positions of the instances and the source position. The PDE may determine a relative position in the audio representation at which the source position appears, and may also determine a relative position for each of the multiple instances of matching text. After determining the relative positions, the PDE may select the instance of matching text having a relative position closest to the relative position of the source position and, in block 312, return the position of that instance. In other embodiments, rather than evaluate multiple matching instances, if the textual representation includes text that appears multiple times in the electronic representation, the PDE may obtain a new audio segment. The new audio segment that the engine obtains may be one that is more likely to include a sequence of words that is unique in the electronic representation. A longer audio segment may be more likely to include a unique sequence of words than a short audio segment with fewer words. Accordingly, if the searching of block 306 returns multiple instances of matching text, in some embodiments the PDE may obtain a longer audio segment. The longer audio segment may be a segment that includes the source position, such as an audio segment that starts at the same position as a previously-obtained audio segment but that is longer. After obtaining the longer audio segment, the engine performs ASR on the segment, and searches the electronic representation based on the textual representation of the longer audio segment. Because the longer audio segment may correspond to a unique sequence of words, it may be more likely that a result of the searching will include only one instance of matching text. The above discussed examples of addressing cases in which multiple instances of text are returned are merely illustrative as multiple matching instances can be addressed in any suitable manner.

ASR engines may be configured to perform ASR based on a set of words and/or phrases. For example, some ASR engines may be configured with a lexicon of words and may also be configured with language models that include N-grams identifying how words may be arranged to form sequences of N words. The ASR engine may evaluate audio segments to identify these words and phrases of the set. In the case that an audio segment includes a word or phrase that does not appear in the set of words/phrases with which the ASR engines is configured, the ASR engine may not accurately recognize the audio segment and a textual representation generated by the ASR engine may be incorrect.

Some textual works may include uncommon words or phrases or words or phrases that were created by the author. For example, textual works may include names or idioms that were created by authors. In the case that an audio segment includes one of these uncommon or created words or phrases, an ASR engine may not properly recognize the audio segment.

In some embodiments, a PDE may configure an ASR engine with words and/or phrases that appear in a textual work. In some such embodiments, the PDE may review the words and/or phrases that appear in an electronic representation of the textual work and configure the ASR engine based on the evaluation. For example, the PDE may create a set of words/phrases that appear in the textual work and may configure an ASR engine with the set. As a particular example, the PDE may create a lexicon, language model, and/or any other suitable description of the text of a textual work and configure an ASR engine to use that lexicon/language model/description when performing ASR on an audio representation of the textual work. In other embodiments, the PDE may add one or more words/phrases that appear in the textual work to a set of words/phrases with which an ASR engine is configured. For example, the PDE may supplement a lexicon or language model with which an ASR engine is configured with words/phrases that appear in the textual work and that did not appear in the lexicon or language model. The PDE may supplement the lexicon or language model in any suitable manner, including by adding the words/phrases that appear in the textual work to the lexicon or language model.

Figure 4:
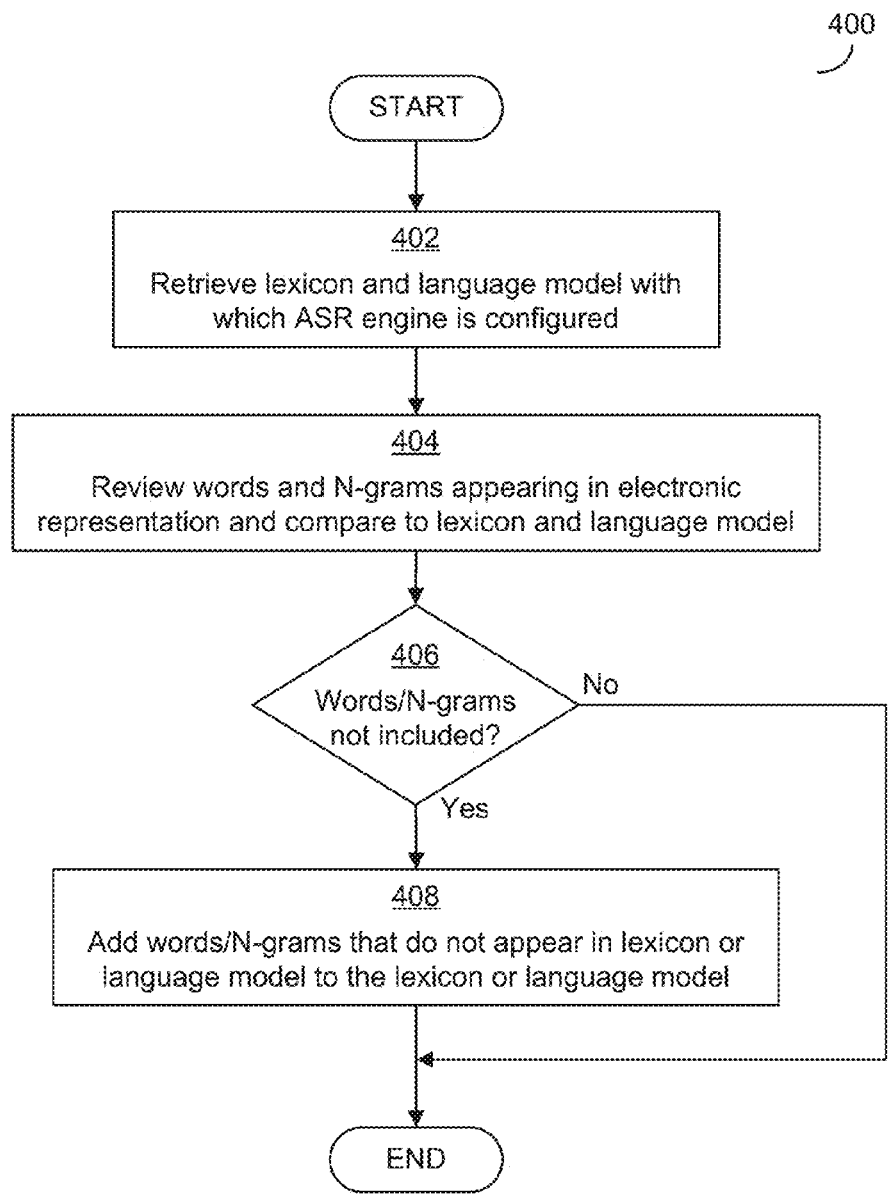
FIG. 4 is a flowchart of a process that may be implemented in some embodiments for configuring an automatic speech recognition (ASR) engine with one or more words and/or phrases that appear in a textual work.

FIG. 4 illustrates a process 400 that a PDE may perform in some embodiments to configure an ASR engine. Through the process 400, the engine may supplement the ASR engine with information regarding the textual work, which may increase a likelihood that the ASR engine will correctly recognize an audio segment of an audio representation of the textual work. It should be appreciated that the techniques described herein are not limited to implementing a process for configuring an ASR engine based on a textual work (e.g., some embodiments may use an ASR engine not customized based on the textual work), and that embodiments that implement such a process are not limited to implementing the specific process of FIG. 4 as any suitable techniques may be emphasized.

Prior to the start of the process 400, an ASR engine is configured to perform ASR using a lexicon and a language model, among other models or other information that may be used in determining words that appear in audio segments. The lexicon includes one or more words and the language model includes one or more N-grams, which may be sequences of N-grams words (where N is a digit).

The process 400 begins in block 402, in which the PDE accesses the lexicon and the language model with which the ASR engine is configured to review the words and N-grams included in the lexicon and language model. In block 404, the PDE obtains the text of the electronic representation of the textual work, reviews the text, and compares the text to the lexicon and language model. In particular, in block 404, the PDE determines whether any of the words that appear in the textual work or any of the N-grams that appear in the textual work do not appear in the lexicon or language model.

In block 406, the PDE determines whether any of the words or N-grams of the textual work were determined to be not included in the lexicon or language model with which the ASR engine is configured. If not, and all words/N-grams appear in the lexicon and language model, the process 400 ends. However, if the engine determines in one block 406 that one or more words or N-grams are not included in the lexicon or language model, then in block 408 the engine adds the excluded words/N-grams to the lexicon or language model with which the ASR engine is configured. By adding the excluded words/N-grams, the ASR engine is configured with the excluded words/N-grams and will be able to recognize the words/N-grams in the audio representation of the textual work. This may increase this likelihood that the ASR engine will accurately recognize audio segments of the audio representation. Once the words/N-grams are added in block 408, the process 400 ends.

Following the process 400, the ASR engine may be used to recognize one or more audio segments of an audio representation of the textual work, and may recognize in the audio segments words or N-grams that were added in block 408. In some embodiments, after the ASR engine is used to recognize the audio segments of the audio representation, the words and/or N-grams that were added in block 408 may be removed. The words and N-grams may be removed to prevent the ASR engine from recognizing those words/N-grams in audio segments of audio representations of other textual works. This may be useful where the words or N-grams correspond to words or idioms that an author created and that are therefore unlikely to appear in other works. In other embodiments, however, the words/N-grams may not be removed from the lexicon or language model.

In the example of FIG. 4, the words and N-grams that are determined to have been excluded from the set of words/phrases with which the ASR engine is configured (e.g., excluded from the lexicon or language model) are added to the set. It should be appreciated that embodiments are not limited to determining excluded words/N-grams and adding the excluded words/N-grams to the set. In some embodiments, words/N-grams may be added to the set without first determining whether any of the words or N-grams were not included in the set. For example, in embodiments in which the ASR engine uses a language model, the N-grams of the textual work may be used to update the language model regardless of whether any of the N-grams were previously included in the language model. This may serve to add N-grams that were previously excluded as well as to add instances of previously-included N-grams to the language model and thereby increase the probability, maintained by the language model, of each N-gram occurring in a textual work. The techniques described herein are not limited to updating a set of words/phrases of an ASR engine in any particular manner.

In addition to a lexicon and language model, some ASR engines may be configured with acoustic models that are used by the ASR engines to recognize phones or phonemes included in an audio segment. These acoustic models may be generic to all types of voices, or may be associated with particular types of speaking voices, such as adult voices and child voices, male voices and female voices, voices with particular accents, etc. Some ASR engines may enable selection of acoustic models with which to process an audio segment, which may enable selection of an acoustic model that matches the voice is speaking in the audio segment. In some embodiments, the ASR engine and/or the PDE may select an acoustic model with which to process an audio segment. The selection may be made before an audio segment that is to be recognized is obtained, such as by configuring the ASR engine to use a particular acoustic model for processing all audio segments of an audio representation.

Selection of an acoustic model may be made based on evaluating some audio of the audio representation, such as by analyzing a sample of the audio representation to determine characteristics of a voice appearing in the audio representation and selecting the acoustic model based on the characteristics. Such a process may be used when one person reads the text in the audio representation and the person's voice is relatively consistent throughout the audio representation. When an audio representation includes text being read aloud, one person may read the text and change his/her voice throughout (e.g., using different voices or accents for different parts of a textual work, such as different voices for quotes from different characters in a novel) or two or more people may read the text. In these other cases, the ASR engine may configure itself or the PDE may configure the ASR engine to use a particular acoustic model after an audio segment has been selected and a voice appearing in the audio segment has been analyzed. Accordingly, in some cases, different acoustic models may be used to recognize different portions of an audio representation of a textual work. In some embodiments, selection of an acoustic model may be made based on characteristics of a voice appearing in an audio segment, while in other embodiments the selection may additionally or alternatively be based on previously stored information regarding a speaker whose voice is included in the audio segment. For example, an audio representation of a textual work may be associated with metadata identifying and/or describing a speaker who reads text aloud in the audio representation, and a selection of an acoustic model may be made based on the information identifying/describing the speaker.

When an ASR engine produces a textual representation of an audio segment, the ASR engine may also produce a value that indicates a confidence of the ASR engine that the audio segment was accurately recognized. In some cases, the confidence value may indicate that the ASR engine has a low confidence that the textual representation is an accurate recognition of an audio segment. In some such cases, it may be wasteful for the PDE to search an electronic representation based on the textual representation. Because the textual representation in these cases may have a high likelihood of being incorrect, searching the text of the electronic representation may not return any results or may return an incorrect result. Accordingly, in some embodiments the PDE may evaluate a confidence value returned by the ASR engine together with a textual representation of an audio segment to determine whether to search an electronic representation based on the textual representation.

Figure 5:
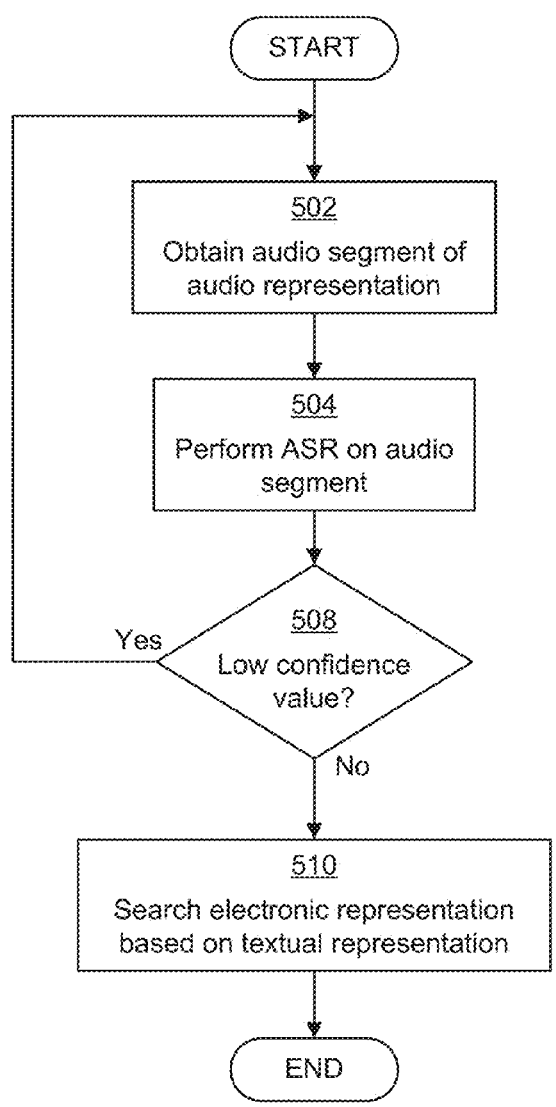
FIG. 5 is a flowchart of a process that may be implemented in some embodiments for selecting an audio segment of an audio representation of a textual work to process using ASR.

FIG. 5 illustrates an example of a process that may be used for determining whether to search an electronic representation based on a textual representation of an audio segment. Prior to the start of the process 500 of FIG. 5, the PDE may receive a request to identify a position corresponding to a source position in a source representation, as discussed above in connection with block 202 of FIG. 2 and block 302 of FIG. 3.

The process 500 begins in block 502, in which the PDE obtains an audio segment of an audio representation of a textual work and performs ASR on the audio segment. The audio segment may be an audio segment that includes audio appearing at the audio position. As discussed above, the PDE may perform ASR on an audio segment in any suitable manner, including by providing the audio segment to an ASR engine external to the PDE and requesting that the ASR engine perform ASR on the audio segment. As a result of performing ASR on the audio segment, the PDE receives a textual representation of the audio segment and a confidence value.

In block 504, the PDE determines whether the confidence value for the textual representation is low by determining whether the confidence value is below a threshold, or in any other suitable manner. If the engine determines in block 504 that the confidence value is not low, then in block 506 the engine searches an electronic representation of the textual work based on the textual representation. The PDE may search the electronic representation in any suitable manner, including according to techniques described above in connection with FIG. 3. After the engine searches the electronic representation, the process 500 ends.

If, however, the PDE determines in block 504 that the confidence value is low, the engine returns to block 502 to select a new audio segment of the audio representation. In some embodiments, the new audio segment may include audio that appears in the audio representation at the source position. However, in these embodiments, the audio segment may be a different audio segment than an audio segment obtained previously by the engine. For example, when previous audio segments started at the source position, a new audio segment may end at the source position. As another example, the audio segment may be of a different length than prior audio segments, such as being longer or shorter than prior audio segments. In other embodiments, the new audio segment may not include audio that appears in the audio representation at the source position. Rather, in some embodiments, the new audio segment may be an audio segment that is proximate to the source position but does not include audio that appears at the source position. For example, the new audio segment may be an audio segment that is within a threshold distance of the source position, such as a segment that starts or ends within a threshold distance of the source position. These are merely examples of ways of selecting a new audio segment as any suitable technique may be used in block 502.

Once the new audio segment is obtained, the engine performs ASR on the new audio segment in block 502 and, in block 504, evaluates the confidence value produced for the new audio segment. The engine may continue selecting new audio segments until an acceptably high confidence value is determined.

While not illustrated in FIG. 5, in some embodiments, a limit may be placed on the number of new audio segments, evaluated. If, after a threshold number of times, a sufficiently high confidence value has not been produced, the PDE may stop obtaining audio segments and output a message that a corresponding position could not be determined, such as the message discussed above in connection with FIG. 3.

The processes of FIGS. 3-5 were described in connection with determining a position in an electronic representation of a textual work that corresponds to a position in an audio representation of the textual work, in response to receiving a request from a reader that identifies a source position in an audio representation. The processes of FIGS. 3-5 may therefore be used to identify a position in an electronic representation and output that position. In some embodiments, the processes of FIGS. 3-5, or similar processes, may also be used as part of determining a position in an audio representation that corresponds to a position in an electronic representation, in response to receiving a request from a reader that identifies a source position in an electronic representation.

Figure 6:
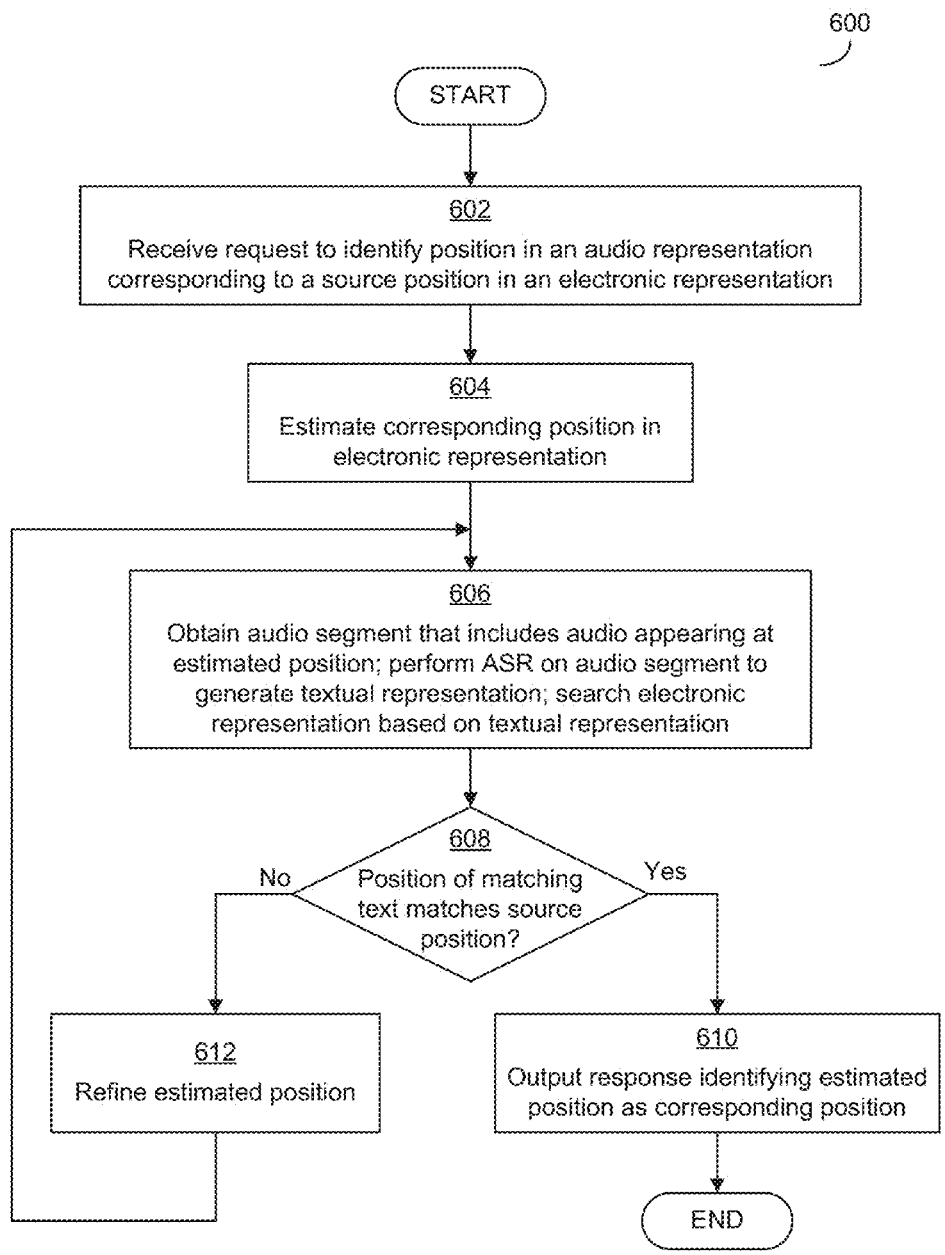
FIG. 6 is a flowchart of a process that may be implemented in some embodiments for determining a position in an audio representation of a textual work that corresponds to a position in an electronic representation of the textual work.

FIG. 6 illustrates a process 600 that may be implemented by the PDE in some embodiments to determine a position in an audio representation that corresponds to a position in an electronic representation. It should be appreciated that corresponding positions between electronic representations and audio representations may be determined in any suitable manner, and that the process 600 of FIG. 6 is provided merely for illustrative purposes.

The process 600 begins in block 602, in which the PDE receives a request to identify a position in an audio representation of a textual work. The request may identify a source position in an electronic representation of the textual work and that the target representation is the audio representation. The source position may be identified in any suitable manner, as techniques described herein are not limited in this respect. In some embodiments, the source position may be identified by a position of a word in the electronic representation, which may be a count of the number of words that precede the word in the electronic representation. In other embodiments, the source position may be identified by a relative position in the electronic representation. As discussed above, a relative position in a representation may be a percentage that indicates an amount of content that precedes the position in the representation, such as whether the position is at approximately halfway through the audio representation, three-quarters of the way through the audio representation, twenty percent of the way through, etc.

In response to receiving the request in block 602, the PDE begins determining a position in the audio representation that corresponds to the source position identified in the request. To do so, in block 604, the engine estimates a position in the audio representation that corresponds to the source position. The engine may estimate the position in any suitable manner, as techniques described herein are not limited in this respect. In some embodiments, the PDE determines a relative position in the electronic representation that corresponds to the source position. When the source position received in the request is formatted as a relative position, the source position may be used in block 604. In other cases, the PDE may evaluate the source position and a length of the electronic representation to produce a relative position based on the source position. Once the engine determines the relative position based on the source position, the relative position may be used to estimate a position in the audio representation. As mentioned above, a relative position may be a fractional position that indicates an amount of content that precedes the position. To estimate a position in the audio representation based on an estimated position in the electronic representation, the engine may set the estimated position to match the relative position of the source position in the electronic representation. For example, if a relative position of the source position is 53 percent of the way through the electronic representation, the PDE may, in block 604, set the estimated position to be 53 percent of the way through the audio representation. This estimate represents an initial guess and may be refined through the remainder of the process 600 of FIG. 6, as discussed below.

Once an estimated position in the audio representation is set in block 604, in block 606 the PDE obtains an audio segment that includes audio appearing at the estimated position, performs ASR on the audio segment to produce a textual representation of the audio segment, and searches the electronic representation based on the textual representation. These acts may be performed in any suitable manner, including according to techniques described above in connection with FIGS. 3-5.

As a result of the searching in block 606, the PDE receives a position in the electronic representation where text appears that matches the textual representation produced by an ASR engine based on the audio segment appearing at the estimated position. In block 608, the PDE determines whether the position determined as a result of block 606 matches the source position. If it does, then the engine may conclude that the estimated position corresponds to the source position. The engine may determine whether the position matches the source position in any suitable manner, including by determining whether the position precisely aligns with the source position or whether the position is within a threshold distance from the source position. The engine may determine whether the position is within a threshold distance of the source position by evaluating relative positions of the two positions in the electronic representation. If the relative positions are within a threshold distance (e.g., within one percent or three percent, or any other suitable threshold), the position determined in block 606 may be determined to match the source position.

If the PDE determines in block 608 that the position in the electronic representation determined in block 606 matches the source position, then the engine can infer that the most recent estimate of a position in the audio representation, which is a position included in the audio segment obtained and recognized using ASR in block 606, corresponds to the source position. Accordingly, in block 610 the engine outputs a response to the request received in block 602. The response may identify the most-recently estimated position and the estimated position as corresponding to the source position, and in some embodiments may result in a device starting presentation of the target representation from the corresponding position. The corresponding position may be identified in any suitable manner, including as a time value. The time value may indicate, for the audio representation, an amount of time that would elapse if the audio representation were played back until the corresponding position reached. The response may be output in any suitable manner, including using techniques discussed above in connection with FIG. 3. Once the response is output in block 610, the process 600 ends. As a result of the process 600, a reader may be able to switch from reading a textual work in an electronic representation to reading the textual work in an audio representation (by listening to the audio representation) at a position that corresponds to a position at which the reader stopped reading the electronic representation.

If, however, the PDE determines in block 608 that the position determined in block 606 does not match the source position, then the PDE in block 612 refines the estimate of a corresponding position in the audio representation and returns to block 606 to obtain a new audio segment, perform ASR, and search the electronic representation. The engine may refine the estimate in block 612 in any suitable manner, as techniques described herein are not limited in this respect. In some embodiments, the PDE may refine the estimate using a form of Newton's Method for identifying a zero of a function, but this is merely illustrative as other techniques may be used.

In some embodiments, the PDE may refine the estimate based on a comparison of relative positions of the last estimated position and the position most recently determined as a result of the searching of block 606. As a result of the comparison, the engine may determine whether a relative position of the position determined in block 606 is before or after the relative position of the last estimated position. As discussed above, a relative position may be a fractional or percentage position that indicates an amount of content that precedes the source position in the audio representation, such as whether the source position is at approximately halfway through the audio representation, three-quarters of the way through the audio representation, twenty percent of the way through, etc. The engine may then select a new estimated position in the audio representation based on a difference between the relative position of the source position and the relative position of the matching text identified in block 606. The new relative position that is selected may be based on the difference in any suitable manner. In some embodiments, the new relative position in the audio representation may be selected by adjusting the relative position of the last estimated position based on value determined by subtracting the relative position of the source position from the relative position of the position of matching text in the electronic representation. For example, when the relative position of the position determined in block 606 is before the source position, the value determined through the subtraction may be added to the relative position of the last estimated position in the audio representation. If the position determined in block 606 is after the source position, the value determined through the subtraction may be subtracted from the relative position of the last estimated position in the audio representation. In other embodiments, the new relative position in the audio representation may be selected by adjusting the relative position of the last estimated position in the audio representation based on a ratio of the source position in the electronic representation and the position of matching text in the electronic representation.

As a particular example of the use of a ratio, assume the source position and, therefore, the first estimated position have relative positions of 53 percent, and the position in the electronic representation determined in a first iteration of block 606 has a relative position of 47 percent. A ratio between 53 percent and 47 percent is 1.128. Accordingly, the engine may multiply the relative position of the estimate (53 percent, in the first iteration) by the ratio, 1.128, to set a new relative position of 59.7 percent.

Once the new relative position is selected, the estimated position in the audio representation may be set to a position in the audio representation that has this new relative position. To continue the example, once the engine selects the relative position of 59.8 percent, the engine may set a new estimated position in the audio representation that has a relative position of 59.8 percent.

After the estimated position is refined by setting a new estimated position, the engine continues to block 606 to select an audio segment that includes the new estimated position, perform ASR on the new audio segment, and search the electronic representation based on a textual representation of the new audio segment. As a result of the searching, the engine will determine a new position in block 606, and the evaluation of the estimated position in block 610 and the refinement of the estimated position in block 614 continues. If another round of refinement is to be performed in block 614, then the new estimated position is set based on a ratio of the source position and the new position that was determined in the most recent performance of block 606.

To continue the example, the last estimated position was 59.8 percent and the relative position of the new position determined in block 606 (i.e., the position in the electronic representation that corresponds to 59.8 percent of the way through the audio representation) may be 55 percent. If the position having the relative position of 55 percent is determined in block 608 not to match the source position (at 53 percent), then the engine may refine the estimate based on a ratio of the source position to the position determined in block 608, in this case the ratio (53 percent/55 percent)=0.963. The engine may therefore multiply the relative position of the last estimated position (59.8 percent) and the ratio (0.963) to yield a new relative position of 57.6 percent.

After the new relative position is set, the PDE returns to and performs the actions of block 604.

The process of refining the estimate based on a difference between relative positions of the last estimated position in the audiobook and the position in the electronic representation determined as a result of the searching continues until the position determined as a result of the searching matches the source position. Then, as discussed above, the last estimated position is output in the response of block 612.

An example of the refinement process discussed in connection with blocks 606, 608, and 612 of FIG. 6 is illustrated in FIGS. 6A-6E. In the example of FIGS. 6A-6E, a source representation is an electronic representation of a textual work, and a target position is to be identified in an audio representation.

Figure 6A:
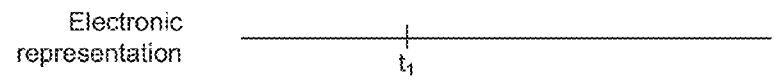
FIGS. 6A-6E illustrate an example of the process illustrated in FIG. 6 determining a position in an audio representation.
Figure 6A:
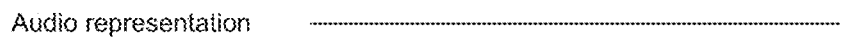
Figure 6B:
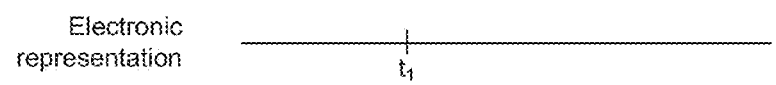
Figure 6B:

FIG. 6A illustrates the start of the refinement process, in which position $t_1$ is identified in the electronic representation. Position $t_1$ is at a relative position in the electronic representation (e.g., 53 percent of the way through the electronic representation). FIG. 6B illustrates that a first audio position $a_1$ is selected by identifying a position in the audio representation that has the same relative position (e.g., 53 percent) as the position $t_1$.

Figure 6C:
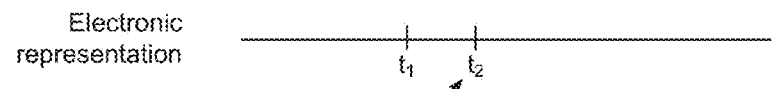
Figure 6C:
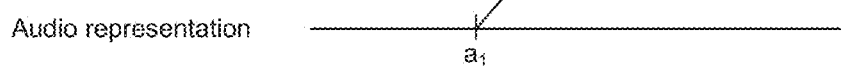

After the position $a_1$ is identified, an audio segment that includes position $a_1$ is obtained, ASR is performed on the audio segment to obtain a textual representation of the audio segment, and the electronic representation is searched based on the textual representation, as discussed in connection with block 608 of FIG. 6. Through this process, a position $t_2$ in the electronic representation is determined, as illustrated in FIG. 6C. Because the position $t_2$ is determined not to match the source position $t_1$, it is determined that position $a_1$ does not correspond to the source position $t_1$. The process therefore continues to refine the estimated audio position, as discussed above in connection with block 612 of FIG. 6.

Figure 6D:
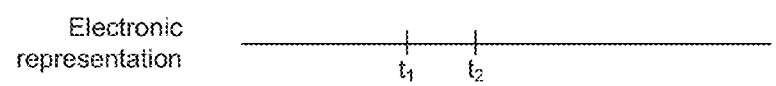
Figure 6D:
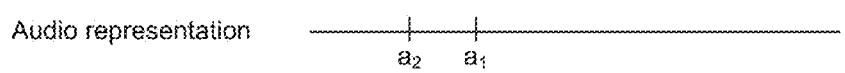
Figure 6E:
Figure 6E:
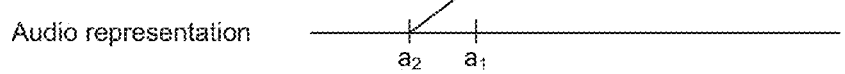

In particular, a new audio position $a_2$ is determined based on the previous position $a_1$ and based on a ratio of the source position and the most-recently-determined text position (in this case, the ratio of source position $t_1$ and the text position $t_2$). As illustrated in FIG. 6D, the position $a_2$ is determined as $a_1*(t_1/t_2)$. After position $a_2$ is determined, the obtaining of an audio segment, performing ASR, and searching is repeated, and a position $t_3$ is determined, as illustrated in FIG. 6E. As shown, position $t_3$ is closer to the source position $t_1$ than the previously-determined text position $t_2$, meaning the new estimated audio position $a_2$ is closer to the correct corresponding audio position than the previously-determined position $a_1$. The refinement process may continue until the determined text position matches the source position, as discussed above in connection with block 608 of FIG. 6.

It should be appreciated that a search of the electronic representation based on a textual representation of an audio segment may not return a position of matching text, or the ASR engine may not produce a sufficiently high-confidence textual representation of any audio segment, as discussed above in connection with FIGS. 3-5. In a case in which the refinement of an estimated position cannot continue for these or other reasons, the PDE, upon determining that the refinement cannot continue, may output a message indicating that a corresponding position could not be identified. In some embodiments, as part of outputting the message, the PDE may output the most recent estimated position. Despite that the most recent estimated position may not be exactly correct, it may assist the reader in switching between representations of the textual work.

In some embodiments, a source position in a source representation of a textual work may be determinable by evaluating a position of a cursor in the source representation. With respect to audio representations, for example, the position of a playback cursor may be maintained in information regarding an audio representation, indicating a position at which playback of audio of the audio representation last ended. With respect to electronic representations, a position cursor may be maintained in information regarding the electronic representation that indicates a word or a portion of the text of the electronic representation that was most recently presented on a display. In the case of an eBook, for example, a cursor may be associated with a first word of a passage of text most recently presented on a display. In embodiments in which such a cursor is maintained, the position requesting engine and/or the PDE may use the cursor information to determine a source position. For example, the position requesting engine or PDE may set the source position to be equal to the cursor position.

In some embodiments, however, a source position may not be set to a cursor position. For example, a reader may seldom cease reading at the first word of a passage of text displayed on a screen, and may cease reading elsewhere within the passage. For example, the reader may cease reading at the end of the first sentence in the passage, end of the first paragraph in the passage, 25 percent of the way through the passage, or at some other point included within the passage of text. Therefore, if the first word of the passage were used as a source position, the source position may not correspond to the position at which the reader ceased reading and may not correspond to the position at which the reader would like to begin reading in a new representation.

Figure 7:
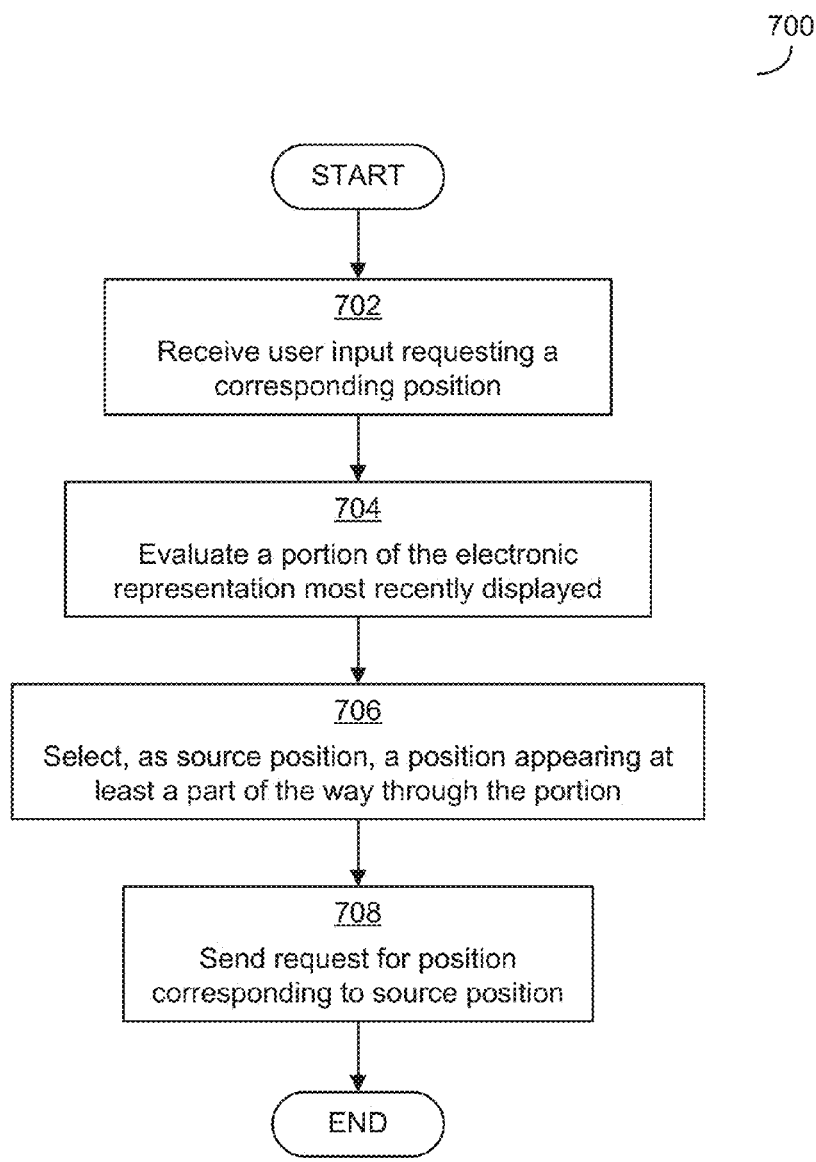
FIG. 7 is a flowchart of a process that may be implemented in some embodiments for determining a source position in an electronic representation of the textual work.

FIG. 7 illustrates a process 700 that may be used by a position requesting engine and/or a PDE to determine a source position in an electronic representation for which a corresponding position in another representation is desired. It should be appreciated that the process 700 is merely illustrative as the techniques described herein are not limited to determining a source position in any particular manner. The process 700 is described below as being carried out by a position requesting engine, though in other embodiments the process 700 may be performed by a PDE or any other suitable engine.

Prior to the start of the process 700, a reader may have been reading text of the electronic representation displayed on a screen of a computing device (e.g., an eBook reader), and a portion of the text may have been most recently displayed on a screen.

The process 700 begins in block 702, in which the position requesting engine receives, via a user interface, a request from a reader to identify a target position in a target representation. The request may be received in any suitable manner via any suitable interface, as techniques described herein are not limited in this respect.

In block 704, the position requesting engine determines a source position in the electronic representation to which the target position in the target representation is to correspond. To determine the position in block 704, the engine evaluates a passage of text, of the electronic representation, that was most recently displayed on a screen for reading by the reader. The passage of text may be identified by information stored by the device on which text of the electronic representation is being displayed. In some embodiments, the passage may be identified by a starting and ending point of the passage, such that an entirety of the passage is identified in information stored by the device. In other embodiments, a start of the passage may be identified, such as by cursor information, and an end of the passage may be determinable based on a size of the screen, text size, or other information.

Once identified, the passage of text is evaluated to determine the source position in block 706. The source position may be determined as any suitable position appearing within the passage of text. In some embodiments, the source position may be determined as the position of the first sentence end (e.g., first full stop) appearing in the passage of text. In other embodiments, the source position may be determined as the position of the first paragraph break appearing in the passage of text. In still other embodiments, a relative position may be used to determine the source position. For example, a relative position such as 25 percent may be used, and a position in the passage of text that is 25 percent of the way through the passage of text may be selected as the source position.

Once the source position is selected in block 706, in block 708 the position requesting facility generates and transmits a request for a position that corresponds to the source position. The request may be formatted in any suitable manner, as the techniques described herein are not limited in this respect. In some embodiments, the request that is generated and transmitted in block 708 may include the source position and may additionally include an identification of the source representation and the target representation in which a corresponding target position is desired. The request may be transmitted to any suitable destination, and in some embodiments may be transmitted via one or more communication networks (e.g., the Internet) to a server that is executing the PDE.

Once the request is generated and transmitted in block 708, the process 700 ends. As a result of the process 700, the position requesting engine has a source position and, as discussed above in connection with FIGS. 1, 2, 3, and 6, sends a request to a PDE that includes the source position. The PDE may then determine a target position that corresponds to the source position and return the target position to the position request engine.

As discussed above, in some embodiments a textual work may be available in one, two, or three representations: an electronic representation, an audio representation, and a hardcopy representation. Techniques that may be implemented in some embodiments by a PDE for identifying corresponding positions in electronic representations and audio representations are discussed above. In some embodiments, a PDE may additionally or alternatively implement techniques for identifying corresponding positions between a hardcopy representation of a textual work and a digital representation of the textual work. A digital representation may be an electronic representation or an audio representation, or any representation in which the content of the representation is digitally encoded in some manner on one or more media.

Figure 8A:
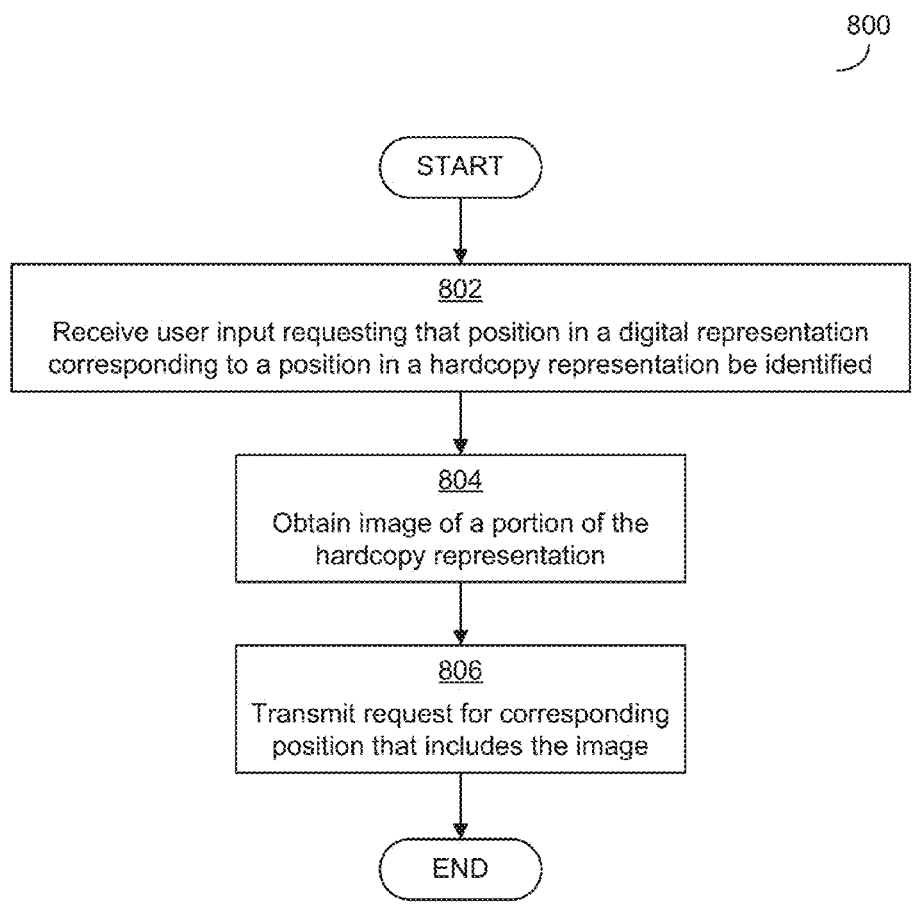
FIG. 8A is a flowchart of a process that may be implemented in some embodiments for generating a request to identify a position in a digital representation of a textual work that corresponds to a position in a hardcopy representation of the textual work.
Figure 8B:
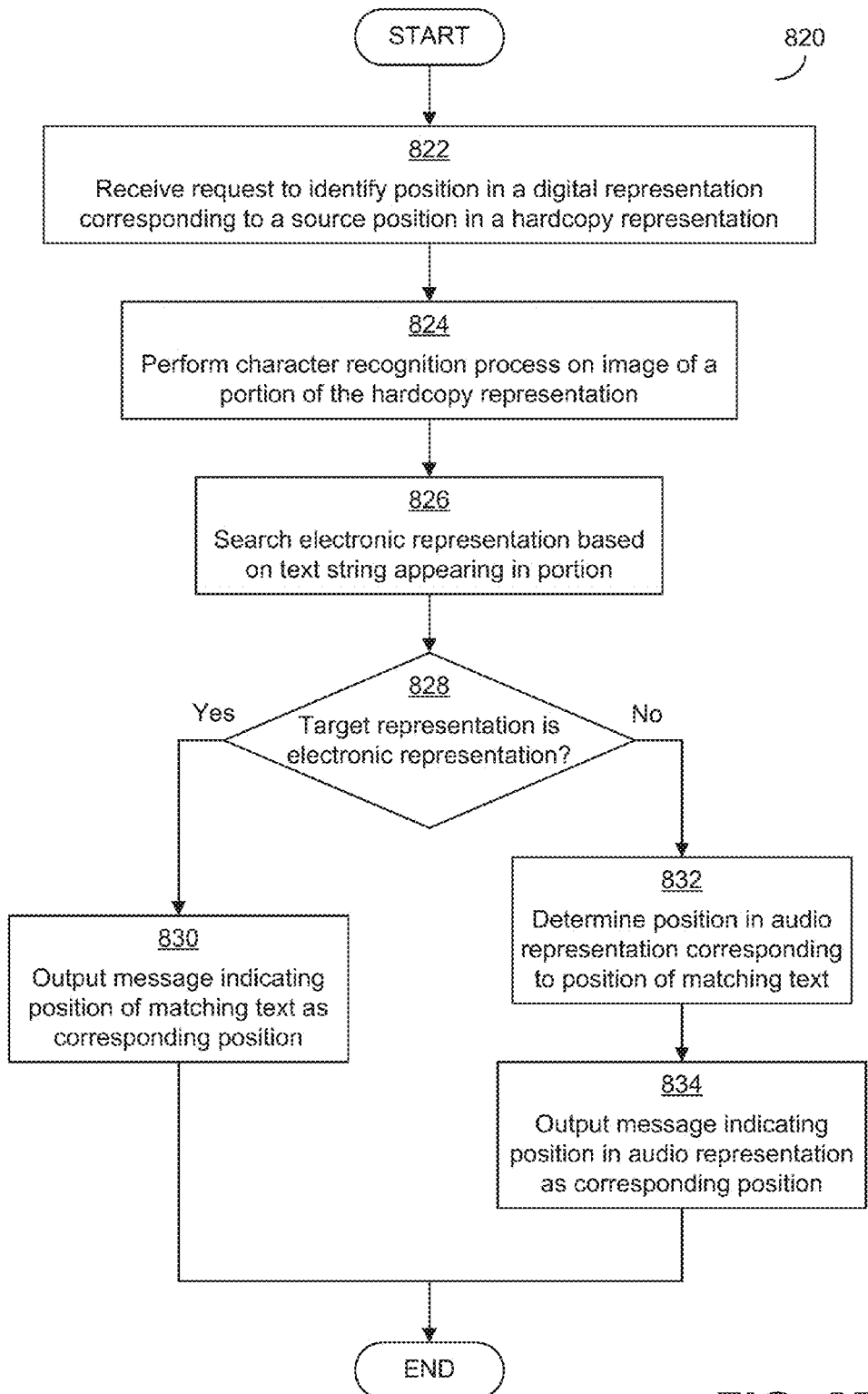
FIG. 8B is a flowchart of a process that may be implemented in some embodiments for determining a position in a digital representation of a textual work that corresponds to a position in a hardcopy representation of the textual work.

FIGS. 8A and 8B illustrate techniques that may be used in some embodiments to identify a position in a digital representation of a textual work that corresponds to a position in a hardcopy representation. These processes are merely illustrative, as techniques described herein are not limited to implementing either or both of the processes of FIGS. 8A and 8B, as other processes for identifying positions corresponding to position in a hardcopy representation of a textual work are possible.

FIG. 8A illustrates a process that may be implemented by a position requesting engine of some embodiments to generate and transmit a request for a position in a digital representation of a textual work that corresponds to a position in a hardcopy representation. Prior to the start of the process 800 of FIG. 8A, a reader of a textual work in a hardcopy representation decides to switch to reading the textual work in a digital representation.

The process 800 begins in block 802, in which the position requesting engine receives input from the reader identifying a target representation and requesting that a corresponding position in the target representation be identified. The target representation may be identified as an electronic representation or an audio representation.

In block 804, in response to receiving the input from the reader, the position requesting engine obtains an image of a portion of the hardcopy representation. The image may be of a portion that includes a position at which the reader would like to begin reading the textual work in a digital representation. The image may be, for example, an image of a page or of a portion of a page, or any other suitable image of a portion of a hardcopy representation. The engine may obtain the image in any suitable manner. In some embodiments, the engine may obtain the image as input from the reader, such as where the reader has previously obtained the image and provides the previously-obtained image to the position requesting engine. In other embodiments, the engine may be executing on (or coupled to) a device that includes a camera and the position requesting engine may include an interface by which a reader may operate the camera to capture the image. Once the image is captured, the position requesting engine may obtain the image.

In block 806, once the position requesting engine obtains the image, the position requesting engine transmits to a PDE a request that includes the image. The request may identify the target representation identified by the reader in the input received in block 802. Once the request is transmitted in block 806, the process 800 ends.

FIG. 8B illustrates a process that may be implemented by a PDE to determine a position in a digital representation of a textual work that corresponds to a position in a hardcopy representation of the textual work. It should be appreciated that all embodiments are not limited to implementing any process for identifying a position corresponding to a position in a hardcopy representation as some embodiments may support suitably only between other types of representations. In addition, embodiments that implement such a process are not limited to the specific process 820 of FIG. 8B, as other implementations are possible.

The process 820 of FIG. 8B starts in block 822, in which the PDE receives a request to identify a corresponding position. The request may be received in any suitable manner, including via a computer communication network. The request received in block 822 includes an image of a portion of the textual work in the hardcopy representation for which the PDE is to determine a corresponding position in a digital representation. The request received in block 822 may also identify a target representation.

In block 824, the PDE determines the source position in part by processing the image received in block 822. The image may be processed using a character recognition process. An optical character recognition (OCR) process is an example of a character recognition process. Through the character recognition process, text corresponding to the image data can be generated. Once a textual representation of the image data is generated, a source position in the textual representation is identified by the PDE in any suitable manner. For example, the engine may determine the source position to be a start of the text included in the image, a position after a start of the textual representation, the position of the first sentence end (e.g., the first full stop) included in the text or the first paragraph break included in the text, a relative position (e.g., 25 percent) into the text appearing in the image, etc. Any suitable position in the textual representation may be selected as the source position.

Once the source position is identified in block 824, in block 826 a text string that includes text appearing at the source position is selected and an electronic representation of the textual work is searched for text matching the text string. The text string may be any suitable text string that includes text appearing at the source position, including a text string that starts at the source position, a text string that ends at the source position, a text string that is centered at the source position, etc. The search of block 826 based on the text string may be carried out in any suitable manner, including using the searching techniques discussed above in connection with FIG. 3.

As a result of the searching of block 826, the PDE identifies a position, in the electronic representation, of text that matches the text string. In block 828, the engine determines whether the request received in block 822 indicated that the target representation is the electronic representation. If so, then the position of the text determined from the searching is identified as the target position corresponding to the source position in the hardcopy representation and, in block 830, a message is output by the PDE that identifies the position determined in block 826 as the target position. The message may be output by the PDE in suitable manner, including according to any of the techniques described above in connection with FIG. 3.

If, however, the PDE determines in block 828 that the target representation is not the electronic representation, then the process 820 continues to block 832. In block 832, the PDE determines a position in an audio representation of the textual work that corresponds to the position in the electronic representation that was determined as a result of the searching of block 826. The engine may determine the position in the audio representation in any suitable manner, including according to techniques described above in connection with FIG. 6. As a result of block 832, the PDE has identified a position in the audio representation that corresponds to the source position in the hardcopy representation. The position in the audio representation is therefore identified as the target position corresponding to the source position and, in block 834, a message is output by the PDE that identifies the position determined in block 832 as the target position. The message may be output by the PDE in suitable manner, including according to any of the techniques described above in connection with FIG. 3.

Once a response message is output by the engine in block 830 or 834, the process 820 ends. Following the process 820, a reader may be informed of a position in a digital representation of a textual work that corresponds to a position in a hardcopy representation. The reader may then switch to reading the textual work in a digital representation and begin reading from the target position.

Figure 9:
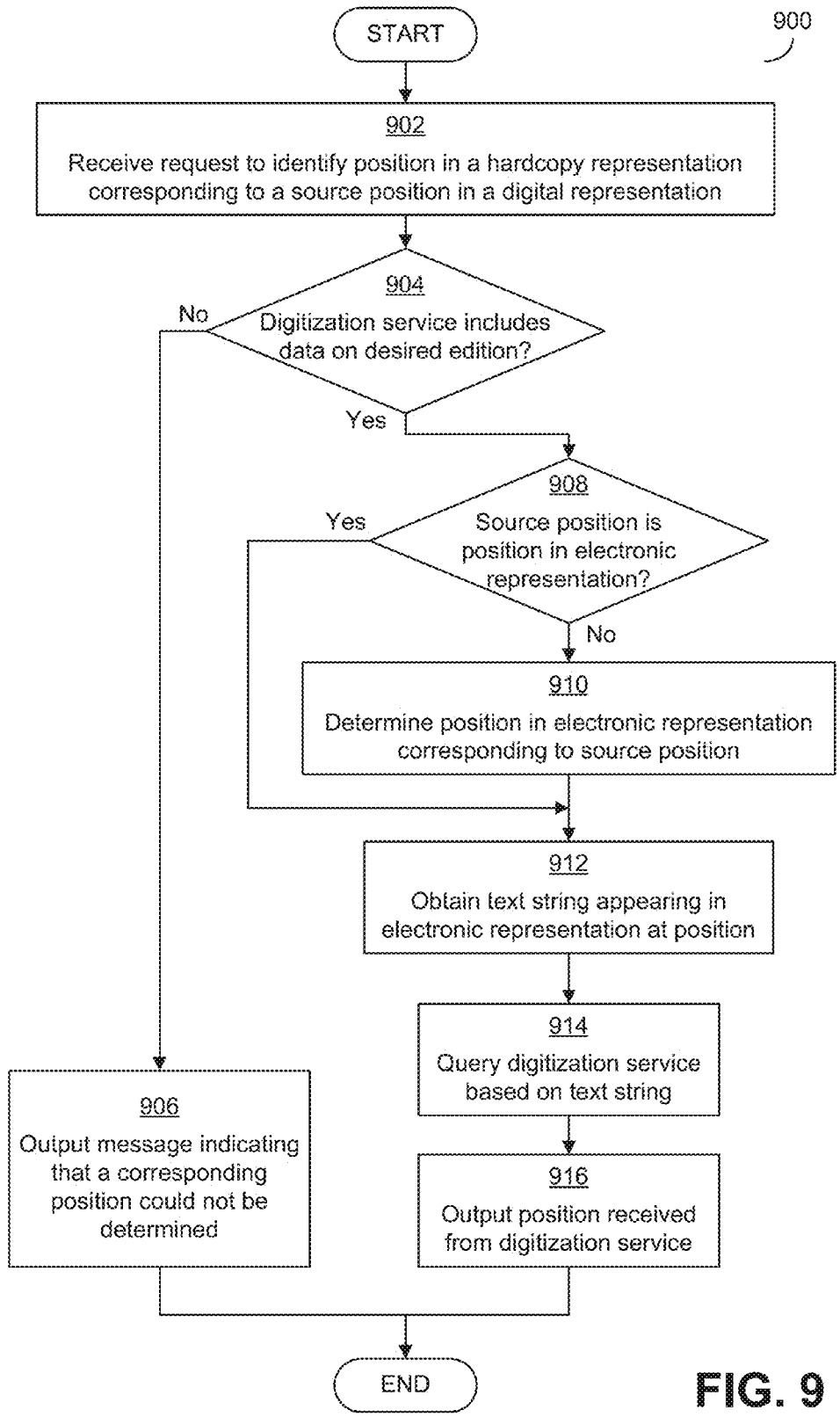
FIG. 9 is a flowchart of a process that may be implemented in some embodiments for determining a position in a hardcopy representation of a textual work that corresponds to a position in a digital representation of the textual work.

In some cases, a reader may desire to switch from a digital representation of a textual work to a hardcopy representation. FIG. 9 illustrates an example of a process that a PDE may implement in some embodiments to facilitate such switching. It should be appreciated that all embodiments are not limited to implementing a technique for determining a position in a hardcopy representation corresponding to a position in a digital representation, and that embodiments that implement such a process are not limited to implementing the specific process of FIG. 9, as other implementations are possible.

In some embodiments, a process for switching from a digital representation of a textual work to a hardcopy representation of the textual work may use data collected by one or more hardcopy digitization services. A hardcopy digitization service, such as the GOOGLE® Books service available from Google, Inc., of Mountain View, Calif., may obtain images of pages of a hardcopy representation of a textual work. The images may preserve the formatting of a hardcopy representation, including pagination of the hardcopy representation and graphics included in pages. The digitization service(s) may also make the hardcopy work electronically searchable, such as by performing a character recognition process on the images of the pages to produce text corresponding to the images. By searching text maintained by a digitization services based on a text string, a page of a hardcopy representation on which the text string appears can be identified. However, digitization services may not include digitized copies of all editions of a textual work, and there may be formatting differences between different hardcopy editions. For example, pagination of a mass market paperback book of a novel may be different from the pagination of a first edition hardcover book of the novel. Accordingly, it may not be desirable to search the digitization service unless it stores the same edition to which a reader wishes to switch.

Prior to the start of the process 900 of FIG. 9, a reader of a textual work in a digital representation decides to switch to reading the hardcopy representation. The process 900 begins in block 902, in which the position requesting engine receives input from the reader requesting that a corresponding position be identified and identifying that the target representation is a hardcopy representation. The request may also include any suitable information identifying an edition of the hardcopy representation to which the reader is to switch. For example, the information regarding the edition may include an International Standard Book Number (ISBN) for the edition. The source representation may also be identified in the request. The source representation may be an electronic representation or an audio representation.

In block 904, one or more digitization services are queried based on the information regarding the edition to determine whether any of the service(s) store information on the edition to which the user desires to switch. If the engine determines in block 904 that the digitization service does not store information on the edition identified by the request received in block 902, in block 906 the engine may output a message indicating that a corresponding position could not be identified and the process 900 ends.

If, however, the PDE determines that a digitization service stores information on the edition of the hardcopy representation to which the reader intends to switch, the process 900 continues to block 908. In block 908, the PDE determines whether the source position identified in the request received in block 902 is a position in an electronic representation or a position in an audio representation. If it is determined in block 908 that the source position is a position in an audio representation, then in block 910 the PDE determines a position in an electronic representation that corresponds to the source position in the audio representation. The PDE may determine the corresponding position in the electronic representation in any suitable manner, including according to any of the techniques described above in connection with FIG. 3.

Once the PDE determines a position in an electronic representation, either because the source position was a position in the electronic representation or through the processing of block 910, in block 912 the engine obtains text string that includes text appearing in the electronic representation at the position. The text string may be any suitable text string of any suitable length, as techniques described herein are not limited in this respect. In some embodiments, the text string may be a string of text that begins at the position in the electronic representation, ends at the position in the electronic representation, or is centered at the position in the electronic representation, or any other suitable text string.

Once the PDE obtains the text string in block 912, the PDE queries the digitization service based on the text string and the desired edition of the hardcopy representation. The engine may query the digitization service via any suitable interface, including an Application Programming Interface (API) and/or a web interface. As a result of the searching of block 914, the PDE receives from the digitization service an identification of a page, of the desired edition, on which text that matches the text string appears. The text that matches the text string may be text that exactly matches the text string or text that is similar to the text string, as techniques described herein are not limited in this respect. After receiving the identification of the page, in block 916 the engine outputs a message as a response to the request received in block 902. The response message may include any suitable information, including information identifying a page number in the edition as the target position that corresponds to the source position. After the engine outputs the message in block 916, the process 900 ends. As a result of the process 900, a reader may be informed of a position in a hardcopy representation that corresponds to a position in a digital representation, so the reader may be able to pick up reading in the hardcopy representation at the position where he/she left off.

In the discussion of FIG. 9 above, the response to the query of the digitization service in block 914 was assumed to include a single result that identifies a position in the hardcopy representation at which text appears that matches the text string obtained from the electronic representation. In some cases, however, the response to the query of the digitization service in block 914 may not include a position in the hardcopy representation or may include multiple positions at which the text matching the text string appears in the hardcopy representation. When the response to the query of block 914 does not include a position in the hardcopy representation, the PDE may output a response message that includes a notification that a corresponding position could not be determined. When the response to the query of block 914 includes multiple positions, the PDE may infer that the text string obtained in block 912 was not a text string that was unique in the textual work and may obtain a text string that has a higher likelihood of being unique by obtaining a longer text string than the string that was obtained in block 912. Any suitable text string may be obtained. Once the PDE obtains the longer text string, the PDE may query the digitization service based on the longer text string. The engine may repeat the process of obtaining longer text strings until the response to the query of the digitization service includes only a single position, does not include any matching position, or, in some embodiments, until a threshold number of retries have been performed.

Additionally, while in the example of FIG. 9 an error message is output in block 906 when the digitization service does not include data for the desired edition, it should be appreciated that the techniques described herein are not limited in this manner. In some embodiments, the PDE may determine whether the digitization service includes information on any edition of the textual work, which may be editions other than the edition to which the reader desires to switch. If so, then the PDE may determine a corresponding position in another edition using the operations discussed in connection with blocks 908-914. Once a corresponding position in another edition is determined, the PDE may output a message indicating the corresponding position in the other edition and identifying that this may not be a correct position, but is an estimate based on other editions of the textual work. In other embodiments, in addition to or as an alternative to determining the corresponding position in another edition of the textual work, the PDE may determine a relative position for the source position and output a message including the relative position. When the relative position is returned, the reader may be able to use the relative position to estimate a corresponding position in the hardcopy to which the reader desires to switch, which may assist the reader in manually determining the corresponding position.

In the illustrative processes discussed above in connection with FIGS. 3-9, a PDE, in response to receiving a request for a target position corresponding to a source position, examines one or more portions of a source representation and/or a target representation to determine the target position. In some embodiments, the PDE may perform such a process each time a request is received for a corresponding position, and as such may examine one or more portions of a representation of a textual work each time a request is received to determine a new corresponding position in the textual work. In some cases, a reader may request a target position that the PDE previously determined. For example, a reader may request a target position that the reader previously requested. As another example, in some embodiments in which a PDE executes on a server or is otherwise accessible by multiple readers, one reader may request a target position that another reader previously requested. In some such cases and in some environments, it may be efficient to take advantage of previous determinations of target positions by storing in a mapping source positions and target positions determined to correspond.

Figure 10:
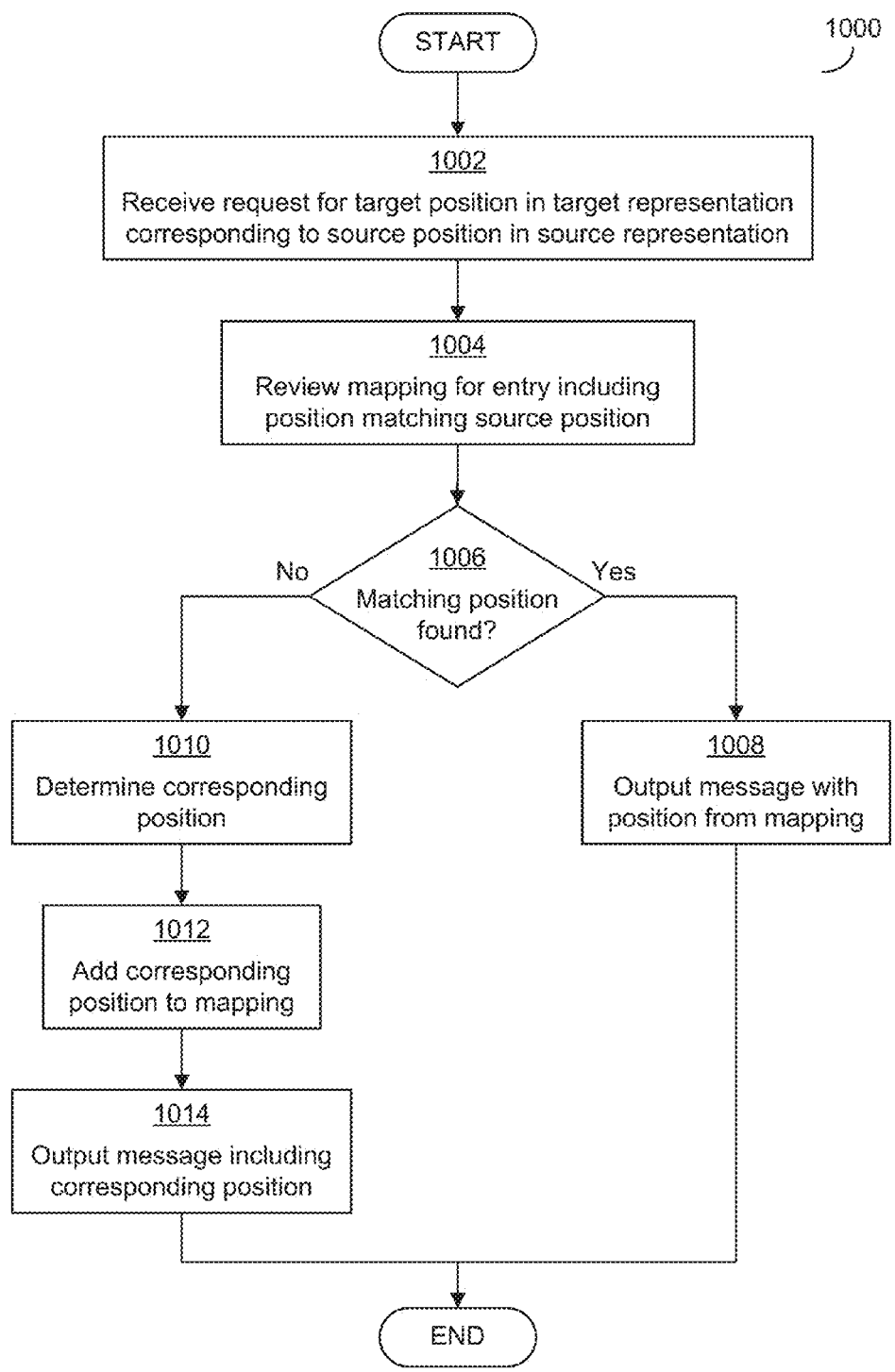
FIG. 10 is a flowchart of a process that may be implemented in some embodiments for determining a target position that corresponds to a source position based at least in part on a mapping between positions in source and target representations of a textual work.

FIG. 10 illustrates an example of a process 1000 that may be implemented by a PDE in some embodiments to maintain a mapping of corresponding positions between representations of a textual work and to determine corresponding positions using the mapping. It should be appreciated that all embodiments are not limited to implementing a process for maintaining and using a mapping and that embodiments that implement such a process are not limited to the specific process of FIG. 10 as other implementations are possible.

Process 1000 begins in block 1002, in which a PDE receives a request to identify a corresponding position. The request may identify a source position, a source representation, and a target representation.

In block 1004 the PDE reviews a mapping to determine whether the mapping includes an entry for the source representation and target representation that includes a position that matches the source position. In some embodiments, a mapping may include pairs of corresponding positions for pairs of representations. For example, such a mapping may include corresponding positions between electronic representations and audio representations, electronic representations and hardcopy representations, and/or audio representations and hardcopy representations. Entries of a mapping may include two positions: a position in one representation and a position in another representation. The PDE may review the mapping in block 1004 to determine whether any of the entries that include a pair of positions for the source and target representations identified in the request include a position that matches the source position.

The PDE may determine whether the mapping includes an entry with a position that matches the source position in any suitable manner. In some embodiments, the PDE may determine whether the mapping includes an entry with a position that exactly matches the source position. The position of the entry may exactly match the source position when, for example, the source position is included in the entry. In other embodiments, the engine may determine whether the mapping includes an entry having a position that matches the source position by determining whether the mapping includes an entry having a position that is similar to the source position. A position may be determined to be similar to the source position in any suitable manner. In some embodiments, a position may be similar to the source position when the position is within a threshold distance of the source position. Whether the position is within a threshold distance of the source position may, in some such embodiments, include comparing relative positions in the source representation of the position in the entry and the source position. In this case, when a difference between the relative positions is below a threshold, the position in the entry may be determined to be similar to the source position and may be identified as a match to the source position.

It may be beneficial in some embodiments to identify similar positions as matched positions because this may lead to gains in efficiency in some environments. There may be a lower likelihood that a subsequent request may include an exact same source position as a source position of a previous request or a target position determined in response to a previous request, but there may be a higher likelihood that a subsequent request may include a source position that is similar. Identifying similar positions may therefore allow an efficiency benefit that results from using the mapping to be realized for more requests. Using similar positions in this way may result in the PDE determining a corresponding position that is not precisely equal to the position that a reader desired to obtain, but close enough for the reader. As discussed in the preceding paragraph, in some embodiments thresholds may be used to determine similarity of position. In these embodiments, the threshold may be set based on a degree of similarity that is acceptable to one or more readers, with smaller thresholds resulting in positions that are more similar being determined to be matches and positions that are less similar being determined not to be matches. In some embodiments, the threshold may be configurable, (e.g., for each individual reader) to allow for adjusting the degree of similarity based on what is acceptable to the reader(s).

The PDE may examine the mapping in block 1004 in any suitable manner. In some embodiments, the mapping may be stored on one or more storage media of the same computing device that as the PDE is executing on, and the engine may retrieve the mapping from the storage media to review the mapping. In other embodiments, the mapping may be stored remotely from the computing device on which the PDE is executing and the PDE may transmit, via a computer communication network, a request to another computing device to review the mapping. The request may include any suitable information, including the source position, the source representation, and/or the target representation. In embodiments in which the mapping is stored remotely from the device on which the PDE is executing, the mapping may include entries added to the mapping only by the PDE or, in some embodiments, may include entries added to the mapping by multiple different position determination engines executing on multiple different devices. In either case, the entries may have been added in response to requests for corresponding positions received from multiple different readers.

If the PDE determines in block 1006 that a position matching the source position is included in an entry of the mapping, then in block 1008 the other position indicated by the entry is obtained from the mapping and the PDE outputs to the request received block 1002.

If, however, the PDE determines in block 1006 that the mapping does not include a position matching the source position, in block 1010 the PDE determines a position that corresponds to the source position. The engine may determine the position in any suitable manner, including using any of the techniques described above in connection with FIGS. 2-9. Once the engine determines the target position in block 1010, in block 1012 the engine adds an entry to the mapping that identifies the source position, the source representation, and the target representation as well as the target position determined in block 1010. In block 1014, the PDE outputs a response to the request received block 1002, which may include the target position determined in block 1010 and the process 1000 ends.

The process 1000 may be used to determine a target position that corresponds to a source position that was identified in a request for a corresponding position. It should be appreciated, however, that embodiments that maintain a mapping are not limited to reviewing a mapping for a position that is identified in a request received from a reader. In some embodiments, a PDE may review a mapping based on an intermediate representation. As should be appreciated from the foregoing, in some embodiments determining a position in one representation that corresponds to a position in another may include an intermediate act of identifying a position in a third representation. For example, as discussed in connection with FIG. 9, determining a position in a hardcopy representation that corresponds to a position in an audio representation may be performed in part by identifying a position in an electronic representation that corresponds to the position in the audio representation and using this position in the electronic representation to identify the position in the hardcopy. In embodiments that maintain a mapping, when a position in an intermediate representation is to be determined, the mapping may be reviewed to determine whether the mapping includes an entry for the position in the intermediate representation. In addition, when a position in an intermediate representation is determined, an entry including the position may be added to the mapping or, when a target position is to be determined from an intermediate representation, the mapping may be reviewed to determine whether the mapping includes an entry including the relevant position in the intermediate representation. Embodiments are not limited to maintaining or using a mapping in any particular manner.

In the examples discussed above, once a target position is determined, the PDE outputs a message that includes the target position. As discussed above, the message may be transmitted to a device from which a request for a corresponding position was received and, upon receiving the response message, the device may output a message to a reader that includes the target position, so as to inform the reader of the corresponding position. It should be appreciated that all embodiments are not limited to using a determined target position in this manner.

In some embodiments, once a target position is determined for a digital target representation, the PDE may transmit a message that causes the target representation of the textual work to be queued to the target position. The message may include an instruction to a device or engine that presents the digital representation to a reader. For example, when the target representation is an electronic representation, the message may be transmitted to a device (e.g., eBook reader 108) or facility that executes on a device and that presents text of the electronic representation to a reader (e.g., an eBook reader application executing on a computing device such as a tablet computer or smart phone). As another example, when the target representation is an audio representation, the message may be transmitted to a device (e.g., audio player 110) or a facility that executes on a device and that presents audio of the audio representation to a reader (e.g., an audio playing application executing on a computing device such as an a tablet or smart phone). The message may instruct the device or facility to update data stored by the device/facility that indicates a position at which a reader is reading the textual work, such as by instructing the device/facility to update cursor information based on the target position. The message may, in some cases, additionally instruct the device or facility to begin presenting the digital representation to a reader, such as by displaying text of an electronic representation or playing audio of an audio representation, starting at the target position.

In some embodiments, the PDE may, upon determining a target position in a target representation, cause a copy of the target representation to be provided to a reader. In these embodiments, a reader may not have access to the target representation at a time that the reader requests to identify a target position in the target representation. Rather, the reader may want to switch from a source representation to a target representation and may want to receive the target representation as well as be informed of the position in the target representation that corresponds to a source position. As one non-limiting example, a reader may be reading a hardcopy of a novel and may desire to have an eBook of the novel delivered to the reader's eBook reader and be informed, on the eBook reader or in any other way, of a position in the eBook that corresponds to a position in the hardcopy. The reader may request the copy and the corresponding position as part of a process for purchasing a copy of a target representation.

Figure 11:
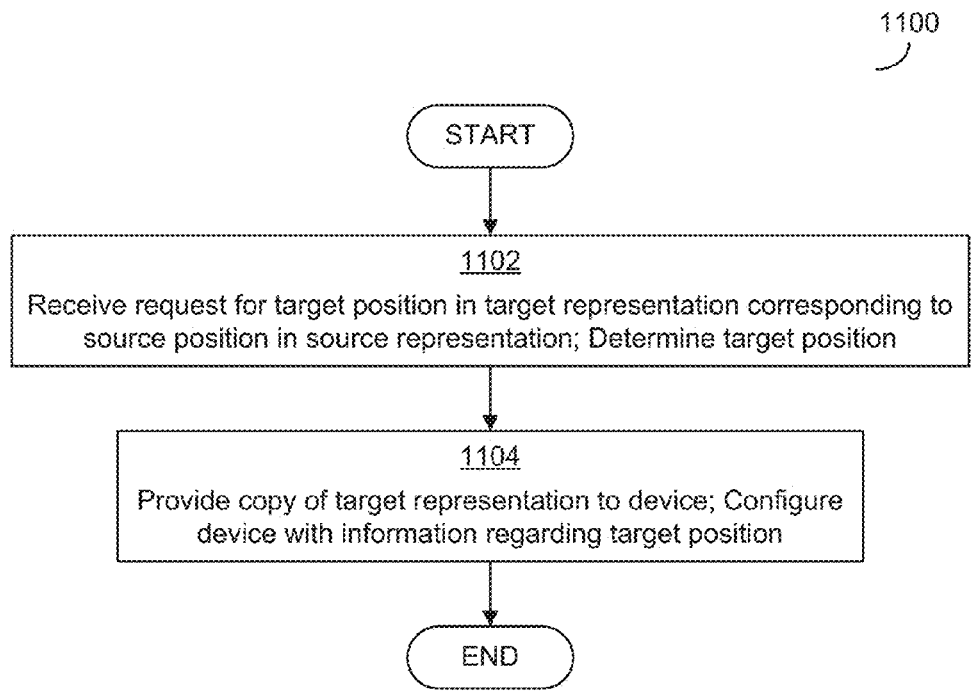
FIG. 11 is a flowchart of a process that may be implemented in some embodiments for providing a copy of a target representation of a textual work to a reader after determining a target position in the target representation that corresponds to a source position in a source representation of the textual work.

FIG. 11 illustrates an example of a process that may be implemented by a PDE to cause a target representation to be provided to a reader along with information regarding a target position. The process 1100 of FIG. 11 may be used in embodiments in which the target representation is a digital representation of a textual work, such as an electronic representation or an audio representation.

The process 1100 begins in block 1102, in which the PDE receives a request for a target position in a target representation that corresponds to a source position in a source representation. In response to the request, the engine determines the target position. The engine may determine the target position in any suitable manner, including according to any of the techniques discussed above in connection with FIGS. 2-10.

Once the PDE determines the target position, in block 1104 the engine provides a copy of the target representation to a device associated with the reader. The device associated with the reader may (but need not) be a device owned by the reader and may, in some cases, be a device from which the request was received in block 1104. The engine may provide a copy of the target representation to the device in any suitable manner, as techniques described herein are not limited in this respect. In some embodiments, the engine may transmit a copy of the target representation to the device. In other embodiments, the engine may communicate with a service that electronically distributes copies of the target representation (e.g., an eBook distribution service, or an audiobook distribution service) and request that the service transmit a copy of the target representation to the device. The engine may communicate with the service in any suitable manner, including by transmitting a request to one or more computing devices on which the service is executing. The request may be transmitted to the service via any suitable interface of the service, as techniques described herein are not limited in this respect. In addition to providing a copy of the target representation to the device associated with the reader, the PDE may configure the device with information regarding the target position determined in block 1102. The engine may configure the device in any suitable manner, including by providing the target position to the device and/or by instructing or requesting that the device set a cursor position of the target representation based on the target position. By configuring the device with information regarding the target position, the device may be configured to present content of the target representation to the reader (e.g., by displaying text on a screen or playing audio) starting from the target position.

Once the engine provides a copy of the target representation to the device and configures the device with information regarding the target position, the process 1100 ends.

In some embodiments, techniques described herein may be carried out using one or more computing devices. Techniques described herein are not limited to operating with any particular type of computing device.

Figure 12:
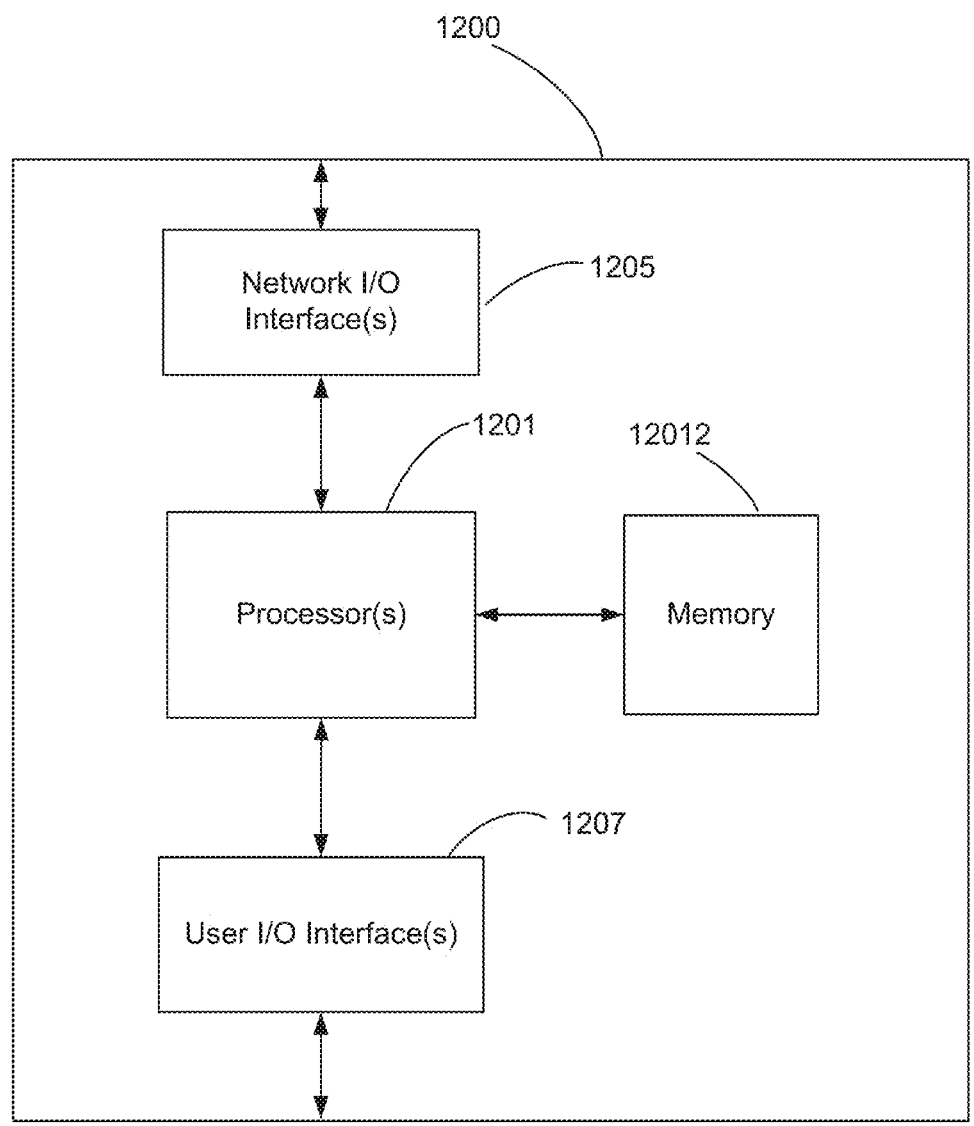
FIG. 12 is a block diagram of some components of a computing device with which some embodiments may operate.

FIG. 12 is a block diagram of an illustrative computing device 1200 that may be used to implement any of the above-described techniques. Computing device 1200 may include one or more processors 1201 and one or more tangible, non-transitory computer-readable storage media (e.g., memory 1203). Memory 1203 may store, in a tangible non-transitory computer-recordable medium, computer program instructions that, when executed, implement any of the above-described functionality. Processor(s) 1201 may be coupled to memory 1203 and may execute such computer program instructions to cause the functionality to be realized and performed.

Computing device 1200 may also include a network input/output (I/O) interface 1205 via which the computing device may communicate with other computing devices (e.g., over a network), and may also include one or more user I/O interfaces 1207, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (e.g., a computer memory, a floppy disk, a compact disk, a magnetic tape, or other tangible, non-transitory computer-readable storage medium) encoded with a computer program (i.e., a plurality of executable instructions) that, when executed on one or more processors, performs the above-discussed functions of one or more embodiments of the present invention. The computer-readable medium may be non-transitory, and may be transportable such that the program stored thereon can be loaded onto any computing device to implement aspects of the present invention discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Accordingly, the foregoing description is by way of example only, and is not intended as limiting. The invention is limited only as defined by the following claims and the equivalents thereto.

What is claimed is:

1. A method for use in identifying corresponding positions in an audio representation of a textual work and an electronic representation of the textual work, the method comprising:
   performing automatic speech recognition (ASR), using an ASR engine, on a first audio segment appearing in the audio representation at a first audio position to generate a first textual representation of the first audio segment, wherein the performing the ASR on the first audio segment comprises generating, with the ASR engine, a confidence value indicating a confidence of the ASR engine that the first textual representation generated by the ASR engine for the first audio segment is an accurate representation of the first audio segment; and
   in response to determining that the confidence value is below a threshold,
   selecting a second audio segment appearing in the audio representation at a second audio position;
   performing ASR, using the ASR engine, on the second audio segment appearing in the audio representation at the second audio position to generate a second textual representation of the second audio segment; and
   identifying a first text position corresponding to the first audio position by searching the electronic representation of the textual work for text matching the second textual representation.

2. The method of claim 1, wherein the searching the electronic representation of the textual work for text matching the second textual representation comprises searching the electronic representation of the textual work for text exactly matching the second textual representation.

3. The method of claim 1, wherein the searching the electronic representation of the textual work comprises performing a fuzzy search of the textual work.

4. The method of claim 1, wherein the searching the electronic representation of the textual work for text matching the second textual representation comprises searching the electronic representation of the textual work for text having an edit distance, when compared to the second textual representation, below a threshold.

5. The method of claim 1, further comprising:
   determining whether a mapping of corresponding positions between the audio representation and the electronic representation includes an entry that includes a position matching the first audio position,
   wherein the performing ASR on the first audio segment is performed in response to determining that the mapping does not include an entry that includes a position matching the first audio position.

6. The method of claim 1, wherein:
   the second audio segment includes audio appearing at an audio position in the first audio segment; and
   the selecting the second audio segment comprises selecting an audio segment that includes the audio appearing at the audio position, the first audio segment being different from the second audio segment.

7. The method of claim 1, further comprising, prior to the performing ASR on the first audio segment:

identifying at least one word and/or at least one phrase included in the electronic representation of the textual work that is not included in a set of words and/or phrases used by an ASR engine that performs the ASR; and adding the at least one word and/or the at least one phrase to the set for use by the ASR engine in performing the ASR on one or more segments of the audio representation.

8. The method of claim 1, wherein the performing ASR on the first audio segment is performed in response to receiving a request for the first text position corresponding to the first audio position, the request identifying the first audio position.

9. The method of claim 1, wherein the performing ASR on the first audio segment is performed in response to receiving a request for the first audio position corresponding to a text position, the request identifying the text position.

10. At least one non-transitory computer-readable storage medium having encoded thereon computer-executable instructions that, when executed by a computer, cause the computer to carry out a method for use in identifying corresponding positions in an audio representation of a textual work and an electronic representation of the textual work, the method comprising:

performing automatic speech recognition (ASR), using an ASR engine, on a first audio segment appearing in the audio representation at a first audio position to generate a first textual representation of the first audio segment, wherein the performing the ASR on the first audio segment comprises generating, with the ASR engine, a confidence value indicating a confidence of the ASR engine that the first textual representation generated by the ASR engine for the first audio segment is an accurate representation of the first audio segment; and in response to determining that the confidence value is below a threshold,
  selecting a second audio segment appearing in the audio representation at a second audio position;
  performing ASR, using the ASR engine, on the second audio segment appearing in the audio representation at the second audio position to generate a second textual representation of the second audio segment; and
  identifying a first text position corresponding to the first audio position by searching the electronic representation of the textual work for text matching the second textual representation.

11. The at least one computer-readable storage medium of claim 10, wherein the searching the electronic representation of the textual work for text matching the second textual representation comprises searching the electronic representation of the textual work for text exactly matching the second textual representation.

12. The at least one computer-readable storage medium of claim 10, wherein the searching the electronic representation of the textual work for text matching the second textual representation comprises searching the electronic representation of the textual work for text having an edit distance, when compared to the second textual representation, below a threshold.

13. The at least one computer-readable storage medium of claim 10, wherein the method further comprises, prior to the performing ASR on the first audio segment:
  identifying at least one word and/or at least one phrase included in the electronic representation of the textual work that is not included in a set of words and/or phrases used by an ASR engine that performs the ASR; and
  adding the at least one word and/or the at least one phrase to the set for use by the ASR engine in performing the ASR on one or more segments of the audio representation.

14. An apparatus comprising:
at least one processor; and
at least one storage medium having encoded thereon executable instructions that, when executed by the at least one processor, cause the at least one processor to carry out a method a method for use in identifying corresponding positions in an audio representation of a textual work and an electronic representation of the textual work, the method comprising:
  performing automatic speech recognition (ASR), using an ASR engine, on a first audio segment appearing in the audio representation at a first audio position to generate a first textual representation of the first audio segment, wherein the performing the ASR on the first audio segment comprises generating, with the ASR engine, a confidence value indicating a confidence of the ASR engine that the first textual representation generated by the ASR engine for the first audio segment is an accurate representation of the first audio segment; and
  in response to determining that the confidence value is below a threshold,
    selecting a second audio segment appearing in the audio representation at a second audio position;
    performing ASR, using the ASR engine, on the second audio segment appearing in the audio representation at the second audio position to generate a second textual representation of the second audio segment; and
    identifying a first text position corresponding to the first audio position by searching the electronic representation of the textual work for text matching the second textual representation.

15. The apparatus of claim 14, wherein the searching the electronic representation of the textual work for text matching the second textual representation comprises searching the electronic representation of the textual work for text exactly matching the second textual representation.

16. The apparatus of claim 14, wherein the method further comprises:
  determining whether a mapping of corresponding positions between the audio representation and the electronic representation includes an entry that includes a position matching the first audio position,
  wherein the performing ASR on the first audio segment is performed in response to determining that the mapping does not include an entry that includes a position matching the first audio position.

17. The apparatus of claim 14, wherein:
the second audio segment includes audio appearing at an audio position in the first audio segment; and
the selecting the second audio segment comprises selecting an audio segment that includes the audio appearing at the audio position, the first audio segment being different from the second audio segment.

18. The apparatus of claim 14, wherein the method further comprises, prior to the performing ASR on the first audio segment:
  identifying at least one word and/or at least one phrase included in the electronic representation of the textual work that is not included in a set of words and/or phrases used by an ASR engine that performs the ASR; and adding the at least one word and/or the at least one phrase to the set for use by the ASR engine in performing the ASR on one or more segments of the audio representation.

19. The apparatus of claim 14, wherein the performing ASR on the first audio segment is performed in response to receiving a request for the first text position corresponding to the first audio position, the request identifying the first audio position.

20. The apparatus of claim 14, wherein the performing ASR on the first audio segment is performed in response to receiving a request for the first audio position corresponding to a text position, the request identifying the text position.

* * * * *